(12) United States Patent
Friedman

(10) Patent No.: US 11,270,009 B2
(45) Date of Patent: Mar. 8, 2022

(54) DETERMINING CONSENT FOR AN ACTION USING A CONSENT POLICY REFLECTING AN INTERPRETATION OF APPLICABLE DATA PRIVACY LAWS

(71) Applicant: salesforce.com, inc., San Francisco, CA (US)

(72) Inventor: Michael Allan Friedman, Bellevue, WA (US)

(73) Assignee: salesforce.com, inc., San Francisco, CA (US)

( * ) Notice: Subject to any disclaimer, the term of this patent is extended or adjusted under 35 U.S.C. 154(b) by 266 days.

(21) Appl. No.: 16/449,261

(22) Filed: Jun. 21, 2019

(65) Prior Publication Data
US 2020/0401708 A1 Dec. 24, 2020

(51) Int. Cl.
*G06F 21/60* (2013.01)
*G06F 21/71* (2013.01)

(52) U.S. Cl.
CPC .... *G06F 21/604* (2013.01); *G06F 2221/2151* (2013.01)

(58) Field of Classification Search
None
See application file for complete search history.

(56) References Cited

U.S. PATENT DOCUMENTS

| | | | | |
|---|---|---|---|---|
| 7,225,460 B2* | 5/2007 | Barzilai | ................ | G06F 21/604 709/217 |
| 9,443,101 B2* | 9/2016 | Jacquin | ............... | G06F 21/6245 |
| 9,674,223 B1* | 6/2017 | Yu | ........................... | H04L 67/00 |
| 10,498,766 B1* | 12/2019 | Yu | ............................ | H04L 67/42 |
| 2004/0002932 A1* | 1/2004 | Horvitz | .................. | G06N 20/00 706/46 |
| 2006/0184995 A1* | 8/2006 | Backes | .................. | G06Q 10/06 726/1 |
| 2009/0106815 A1* | 4/2009 | Brodie | .................. | G06F 21/604 726/1 |
| 2013/0111545 A1* | 5/2013 | Sharma | ................... | H04L 63/10 726/1 |

(Continued)

OTHER PUBLICATIONS

A Tag-Based Data Model for Privacy-Preserving Medical Applications. Nepal. Springer-Verlag. (Year: 2006).*

(Continued)

*Primary Examiner* — Venkat Perungavoor
(74) *Attorney, Agent, or Firm* — Nicholson, De Vos, Webster & Elliott, LLP

(57) ABSTRACT

Methods and systems for using consent policies to determine whether to proceed with actions relative to persons based on a hierarchy of consent values for that person are described. Responsive to a query, records are retrieved which pertain to a person's consent for another entity to perform an action relative to the person in view of data privacy laws. A consent policy is selected. The selected consent policy includes rules that are configurable to reflect a manner to comply with data privacy laws. The selected consent policy is applied to the records. Applying the selected consent policy comprises applying rules to find a result for a second level of the hierarchy of consent values, determining a result for a first level of the hierarchy of consent values, and applying rules to determine whether to proceed with the action relative to the person.

18 Claims, 11 Drawing Sheets

Responsive to applying the second plurality of rules, respond to the query with a determination of whether to proceed with the action relative to the person 190

(56) References Cited

U.S. PATENT DOCUMENTS

| | | | |
|---|---|---|---|
| 2017/0068812 A1* | 3/2017 | Zhai | G06F 21/62 |
| 2018/0189348 A1 | 7/2018 | Sirohi et al. | |
| 2018/0189349 A1 | 7/2018 | Sirohi et al. | |
| 2020/0034553 A1* | 1/2020 | Kenyon | H04L 9/3247 |
| 2020/0097574 A1 | 3/2020 | Hay et al. | |
| 2020/0097680 A1 | 3/2020 | Hay et al. | |
| 2020/0364224 A1 | 11/2020 | Hay et al. | |
| 2020/0364669 A1 | 11/2020 | Hay et al. | |

OTHER PUBLICATIONS

Secure Data Sharing and Processing in Heterogeneous Clouds. Suzie. Elsevier. (Year: 2015).*
Cloud Computing Security Risks with Authorization Access for Secure Multi-Tenancy Based on AAAS Protocol. Abd. IEEE. (Year: 2015).*
Privacy and Security Challenges Towards Cloud Based Access Control in Electronic Health Records. Rana. AJIT. (Year: 2017).*
Enterprise Architecture for Cloud-based ERP System Development. Gunawan. IEEE. (Year: 2014).*
Analysis of software as a service (SaaS) for software service provision alternative: a case study of e-office on demand service of PT. Telkom Indonesia. Hidayanto. Inderscience. (Year: 2012).*
Security and Privacy of Cloud Storage as Personal Digital Archive Storage Media. Kusumawardhani. Record and Library Journal. (Year: 2018).*
A Multi-Tenant RBAC Model for Collaborative Cloud Services. Tang. IEEE. (Year: 2013).*
Privacy Protected Content Sharing in Extended Home Environment Over Content-Centric Networking. Kim. IEEE. (Year: 2012).*
Hierarchical Access Control for SDP-IoT. Lee. IEEE. (Year: 2020).*
A Mechanism to Enhance the Data Security and User Authorization in Cloud. Singh. IJICS. (Year: 2019).*
Autonomous Decentralized Authorization and Authentication Management for Hierarchical Multi-Tenancy. Zuo. IEICE. (Year: 2016).*
Salesforce, "Force.com REST API Developer Guide," Version 41.0, Winter '18, Dec. 5, 2017, 232 pages.
Salesforce, "REST API Developer Guide," Version 42.0, Spring '18, Apr. 12, 2018, 244 pages.
Salesforce, "REST API Developer Guide," Version 43.0, Summer '18, Jul. 30, 2018, 254 pages.
Salesforce, "REST API Developer Guide," Version 44.0, Winter '19, Dec. 4, 2018, 268 pages.
Salesforce, "REST API Developer Guide," Version 45.0, Spring '19, Mar. 13, 2019, 275 pages.
Franks, C., "The Disjunctive Normal Form Theorem: Intermediate Logic," University of Notre Dame, Sep. 13, 2011, downloaded from https://www3.nd.edu/~cfranks/dnf.pdf, pp. 1-4.

* cited by examiner

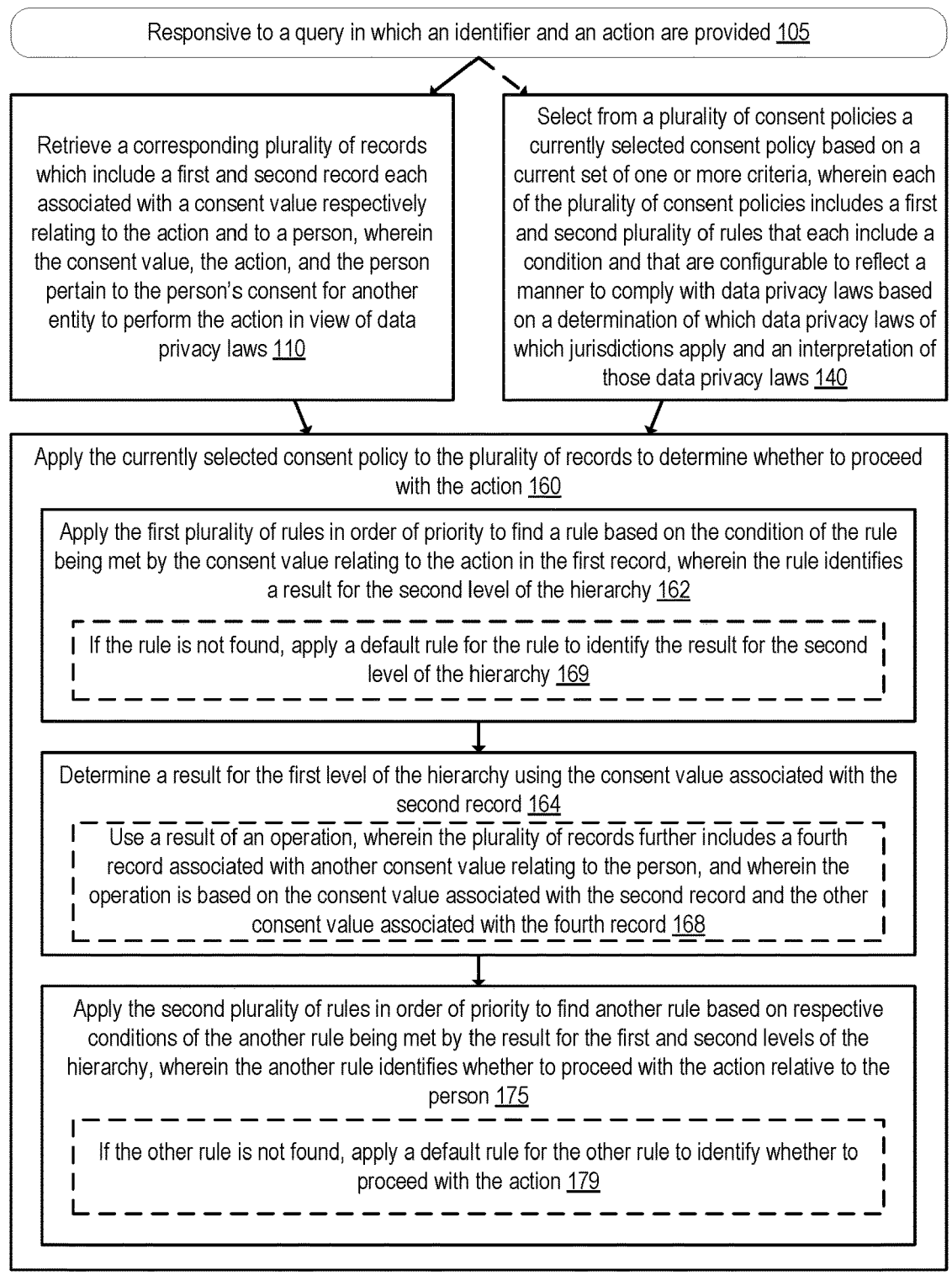

Fig. 2B
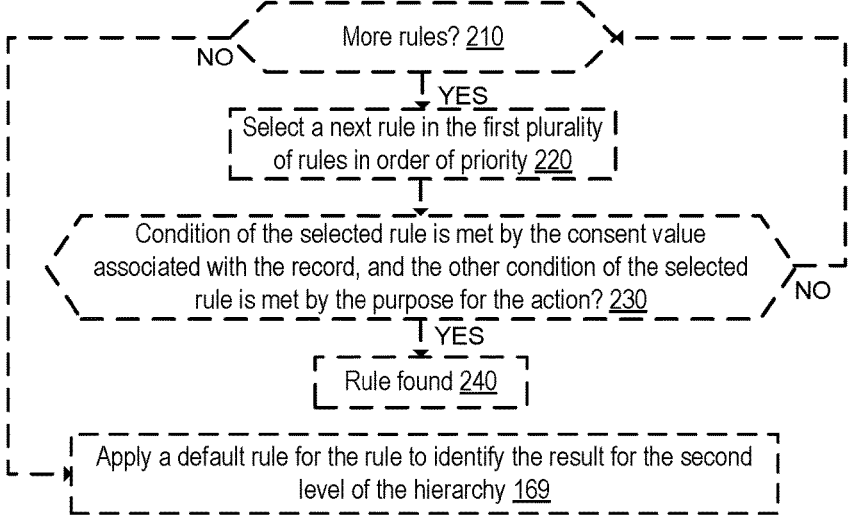
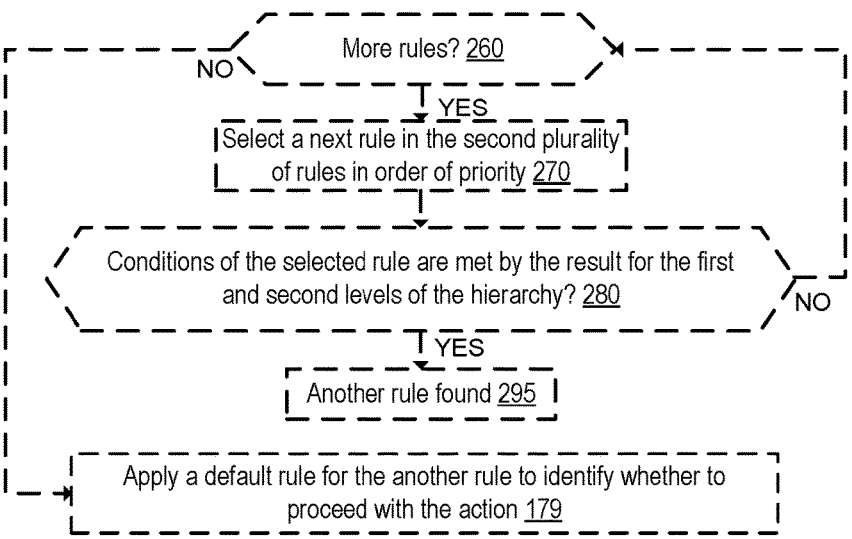

Fig. 3A

First Plurality of Rules 346A-H

| Yet another condition to be met by the purpose provided in the query 359A-H | Condition to be met by the consent value relating to the action 335A-H | Another condition to be met by the purpose for the action 345A-H | Result 355A-H | Explanation 357A-H | |
|---|---|---|---|---|---|
| [null] | OPT-OUT NON-SPECIFIC PURPOSE | ANY OR NO PURPOSE | FALSE | EXPLICIT SUCCESS | Rule 346A |
| [null] | OPT-OUT SPECIFIC PURPOSE | PASSED PURPOSE | FALSE | EXPLICIT SUCCESS | Rule 346B |
| NO SPECIFIC PURPOSE | OPT-OUT SPECIFIC PURPOSE | ANY OR NO PURPOSE | FALSE | EXPLICIT SUCCESS | Rule 346C |
| [null] | OPT-IN NON-SPECIFIC PURPOSE | NO SPECIFIC PURPOSE | TRUE | SUCCESS | Rule 346D |
| [null] | OPT-IN SPECIFIC PURPOSE | PASSED PURPOSE | TRUE | SUCCESS | Rule 346E |
| NO SPECIFIC PURPOSE | OPT-IN SPECIFIC PURPOSE | PASSED PURPOSE | FALSE | NO SPECIFIC PURPOSE | Rule 346F |
| [null] | SEEN | ANY OR NO PURPOSE | FALSE | INFO NOT FOUND | Rule 346G |
| [null] | NOT SEEN | ANY OR NO PURPOSE | FALSE | INFO NOT FOUND | Rule 346H |
| [null] | [null] | [null] | FALSE | INFO NOT FOUND | Rule 346XX |

Fig. 3B

| Value for Condition 335 | Condition Met By |
|---|---|
| OPT-OUT NON-SPECIFIC PURPOSE | Consent value of "opt-out" when consent value not associated with a purpose |
| OPT-OUT SPECIFIC PURPOSE | Consent value of "opt-out" when consent value associated with a specific purpose |
| OPT-IN NON-SPECIFIC PURPOSE | Consent value of "opt-in" when consent value not associated with a purpose |
| OPT-IN SPECIFIC PURPOSE | Consent value of "opt-in" when consent value associated with a specific purpose |
| SEEN | Consent value of "seen" |
| NOT SEEN | Consent value of "not seen" |
| [null] | Any consent value |

Fig. 3C

| Value for Another Condition 345 | Condition Met By |
|---|---|
| ANY OR NO PURPOSE | Any purpose if purpose associated with consent value, or if no purpose associated with consent value |
| PASSED PURPOSE | If purpose associated with consent value and purpose is that which is provided in the query |
| [null] | Any purpose |

Fig. 3D

| Value for Yet Another Condition 359 | Condition Met By |
|---|---|
| [null] | Any purpose or the absence of a purpose provided in the query |
| NO SPECIFIC PURPOSE | If no purpose provided in the query |

Fig. 3E

| Value for Explanation 357 | Description |
|---|---|
| SUCCESS | Result definitive based on consent value |
| EXPLICIT SUCCESS | Result definitive based on unambiguous consent value |
| NO SPECIFIC PURPOSE | No specific purpose in query, found opt-in value associated with a specific purpose but no opt-in not associated with a purpose found |
| INFO NOT FOUND | Consent value, or lack of consent value, insufficient for TRUE result |

Fig. 3F

Second Plurality of Rules 344A-N

| Condition to be met by the result for the second level of the hierarchy 365A-N | Condition to be met by the purpose for the action 375A-N | Condition to be met by the result for the first level of the hierarchy 385A-N | Result 392A-N | Explanation 397A-N | |
|---|---|---|---|---|---|
| UNKNOWN | [null] | OPT IN | FALSE | SUCCESS | Rule 344A |
| UNKNOWN | [null] | OPT OUT | FALSE | SUCCESS | Rule 344B |
| UNKNOWN | [null] | UNKNOWN | FALSE | SUCCESS | Rule 344C |
| OPT-IN | NON MATCHING PURPOSE | UNKNOWN | TRUE | SUCCESS | Rule 344D |
| OPT-IN | [null] | NON OPT OUT | TRUE | SUCCESS | Rule 344E |
| OPT-IN | [null] | OPT OUT | FALSE | NO SPECIFIC PURPOSE | Rule 344F |
| OPT-IN | [null] | UNKNOWN | FALSE | INFO NOT FOUND | Rule 344G |
| OPT-IN | NON MATCHING PURPOSE | NON OPT OUT | FALSE | INFO NOT FOUND | Rule 344H |
| OPT-OUT | [null] | NON OPT OUT | FALSE | INFO NOT FOUND | Rule 344I |
| NOT SEEN | [null] | UNKNOWN | FALSE | INFO NOT FOUND | Rule 344J |
| NOT SEEN | [null] | NON OPT OUT | FALSE | INFO NOT FOUND | Rule 344K |
| NOT SEEN | [null] | OPT OUT | FALSE | INFO NOT FOUND | Rule 344L |
| SEEN | [null] | UNKNOWN | FALSE | INFO NOT FOUND | Rule 344M |
| SEEN | [null] | NO OPT OUT | FALSE | INFO NOT FOUND | Rule 344N |
| [null] | [null] | [null] | FALSE | INFO NOT FOUND | Rule 344XX |

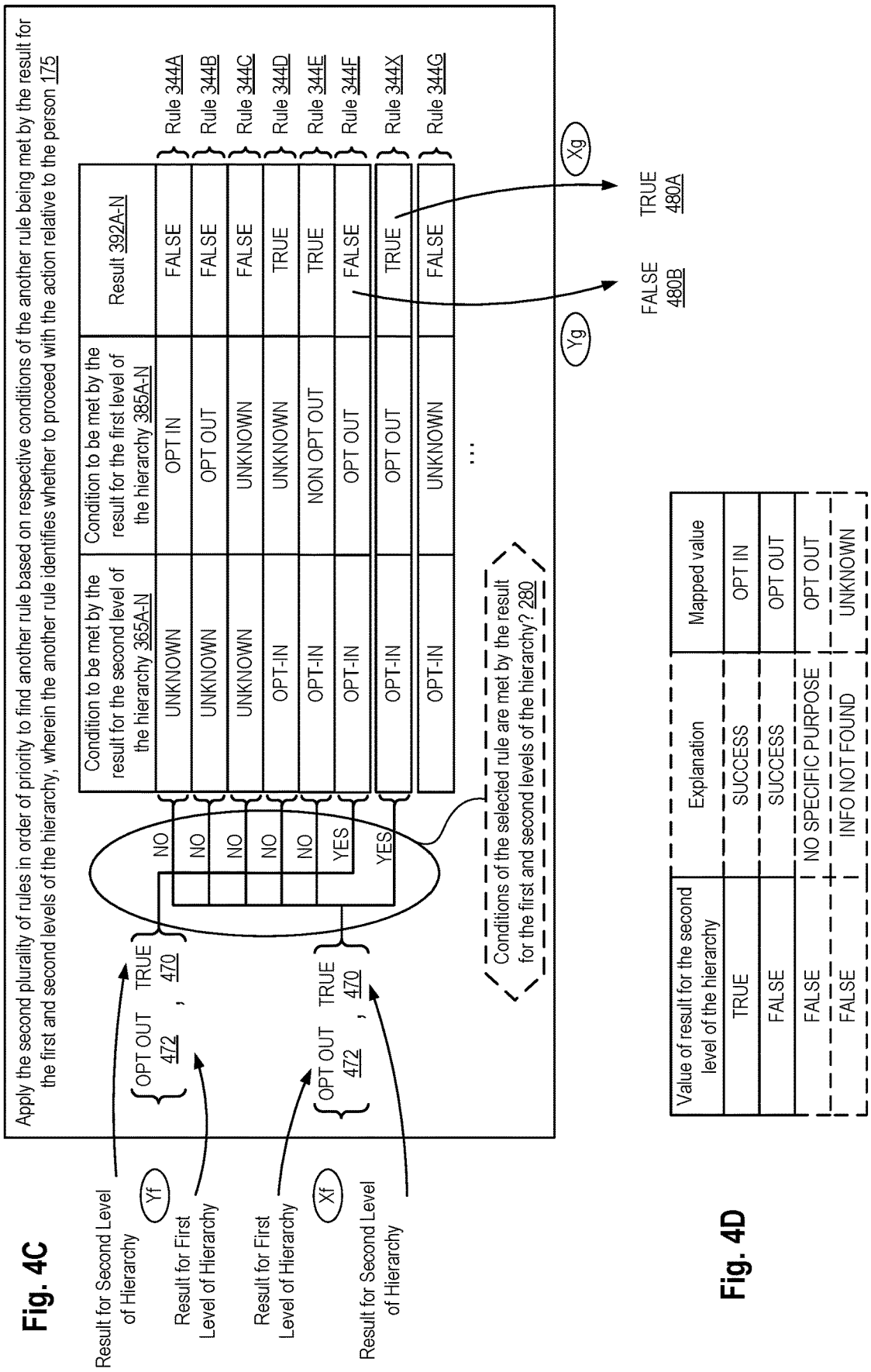

DETERMINING CONSENT FOR AN ACTION USING A CONSENT POLICY REFLECTING AN INTERPRETATION OF APPLICABLE DATA PRIVACY LAWS

TECHNICAL FIELD

One or more implementations relate to complying with data privacy laws; and more specifically, to determining consent for an action using a consent policy reflecting an interpretation of such laws.

BACKGROUND ART

Data privacy laws and regulations (such laws and regulations collectively referred to herein as "laws") are proliferating, especially in the area of consent. Data privacy laws and regulations may restrict, amongst other things, the collection, disclosure, and/or use of information pertaining to a person. Data privacy laws may require a person's consent before an entity performs an action relative to the person. In this context, a consent value is an electronic record of a person's manifestation of consent to an act, such as a record of a person's assent to being contacted for marketing purposes.

A person can provide or deny consent explicitly. For example, consent can be provided or denied explicitly by the person checking a box in a graphical user interface (e.g., on a web page or in an application) or via email (e.g., subscribing to or unsubscribing from emails). Consent may also be provided or denied via other means, such as in a contract or by placing an order to buy goods or services. Such consent may be explicit or implicit, and/or ambiguous. Consent or denial of consent may also be implied when a user ignores a request for an indication of consent. For example, a webpage may display a message asking that the user browsing the webpage consents to the website's use of cookies. Rather than provide an indication of consent (e.g., "opt-in" or "opt-out"), the user may simply acknowledge the message (e.g., by continuing to browse the webpage or other webpages of the website) or dismiss it (e.g., by selecting a "close" button on the message). Thus, a person's consent may be explicit, implicit, and/or ambiguous. Additionally, a person's consent may be unknown because the person has provided neither an explicit nor an implicit indication of consent.

Consent can be classified in a hierarchy of consent values based on the granularity of the consent. One level of granularity may be a global opt-in or opt-out where opt-in means to consent and opt-out means not to consent (e.g., to deny consent). Another level of granularity may be consent to a particular action such as being contacted (e.g., via email, telephone, social media, etc.) or tracked (e.g., geographically, such as via GPS, or online, such as via tracking cookies). Yet another level of granularity may be consent for a particular action via particular means, such as contact via a particular email address (e.g., a personal email address as distinguished from a work email address). And a further level of granularity may be consent for a particular purpose (e.g., for solicitation, invoicing, customer support, etc.). For a particular person, these levels of granularity can be conceived of as a hierarchy of consent values. Notably however, a hierarchy of consent values can have one, some, or all of these levels, and/or other levels of granularity. Also, hierarchies of consent values can have different ordering of these or other levels (e.g., a level corresponding to consent for a particular purpose may be higher or lower in a hierarchy than a level corresponding to consent for a particular action). A consent value at different ones of the levels of a hierarchy of consent values can be one of opt-in, opt-out, or other values (e.g., unknown, indicating that the consent value is unknown (e.g., because the person has not provided an indication of consent, the consent value is implicit and/or ambiguous, and/or an error occurred in retrieving a consent value, etc.).

Consent can also be defined in terms of time. A person may provide consent or deny consent at one time, and at a later time deny consent or provide consent respectively. Additionally or alternatively, a person may provide consent or deny consent for a definite or indefinite period of time (e.g., for one week, one month, one year, the duration of a legal relationship, until consent is provided or revoked, etc.). Thus, when determining whether to proceed with an action relative to a person, the validity of the person's consent (or denial of consent) to an action may be relevant.

Typically, an entity will store consent values pertaining to a person in a database; specifically, one or more records may be associated with consent values, and those records stored in one or more database objects. A consent value may be associated with a timestamp (i.e., a value representing a date and/or time), and/or an effective time range (i.e., a period of time during which the consent value is effective or valid). The timestamp and/or effective time range for a consent value may be associated with the record(s) associated with that consent value (e.g., the record(s) may be stored in a temporal database, may include one or more fields containing timestamps, etc.).

A database may comprise one or more database objects that are managed by a database management system (DBMS), each database object may include a set of records, and each record may comprise a set of fields. A record may take different forms based on the database model being used and/or the specific database object to which the record belongs; e.g., a record may be: 1) a row in a table of a relational database; 2) a JavaScript Object Notation (JSON) object; 3) an Extensible Markup Language (XML) document; 4) a key-value pair; etc. A database object can be unstructured or have a structure defined by the DBMS (a standard database object) and/or defined by a user (a custom database object). In some implementations of a cloud database (a database that runs on a cloud platform and that is provided as a database service), identifiers are used instead of database keys, and relationships are used instead of foreign keys.

While implementations may use one or more types of databases, a relational database with tables is sometimes described to simplify understanding. In a relational database management system (RDBMS), each relational database table (which is a type of database object) generally contains one or more data categories logically arranged as columns according to a schema, where the columns of the relational database table are different ones of the fields from the plurality of records, and where rows of the relational database table are different ones of a plurality of records and each contains an instance of data for each category defined by the fields. Thus, the fields of a record are defined by the structure of the database object to which the field belongs. By way of example, a customer relationship management (CRM) database may include a table that describes a customer with fields for contact information such as name, address, phone number, fax number, etc. The database may also contain tables with records associated with consent values for persons belonging to that customer.

BRIEF DESCRIPTION OF THE DRAWINGS

Although the following figures depict various exemplary implementations, alternative implementations are within the spirit and scope of the appended claims. In the drawings:

FIG. 1B is a flow diagram illustrating a method for selecting a consent policy, retrieving a plurality of records associated with consent values, and applying the currently selected consent policy to those records, according to some example implementations.

FIG. 1C is a flow diagram illustrating an exemplary way for responding to a query with a determination of whether to proceed, according to some example implementations.

FIG. 2B is a more detailed flow diagram to illustrate applying a first and second plurality of rules of a consent policy to records associated with consent values, according to some example implementations.

FIG. 3A is a table illustrating exemplary rules to be applied to records associated with consent values relating to an action, where the rules identify a result for a second level of a hierarchy of consent values, according to some example implementations.

FIG. 3B is a table illustrating exemplary values for a condition of a rule to be applied to records associated with consent values relating to an action, according to some example implementations.

FIG. 3C is a table illustrating exemplary values for another condition of a rule to be applied to records associated with consent values relating to an action, according to some example implementations.

FIG. 3D is a table illustrating exemplary values for yet another condition of a rule to be applied to records associated with consent values relating to an action, according to some example implementations.

FIG. 3E is a table illustrating exemplary values for an explanation of the result of a rule to be applied to records associated with consent values, according to some example implementations.

FIG. 3F is a table illustrating exemplary rules to be applied to records associated with consent values relating to a person and to results for a second level of a hierarchy of consent values, according to some example implementations.

FIG. 4C is a flow diagram illustrating exemplary ways to apply rules to records associated with consent values relating to a person and to results for a second level of a hierarchy of consent values, according to some example implementations.

FIG. 4D is a table illustrating exemplary ways of mapping the result for a second level of a hierarchy of consent values to consent values, according to some example implementations.

DETAILED DESCRIPTION

Figure 1A:
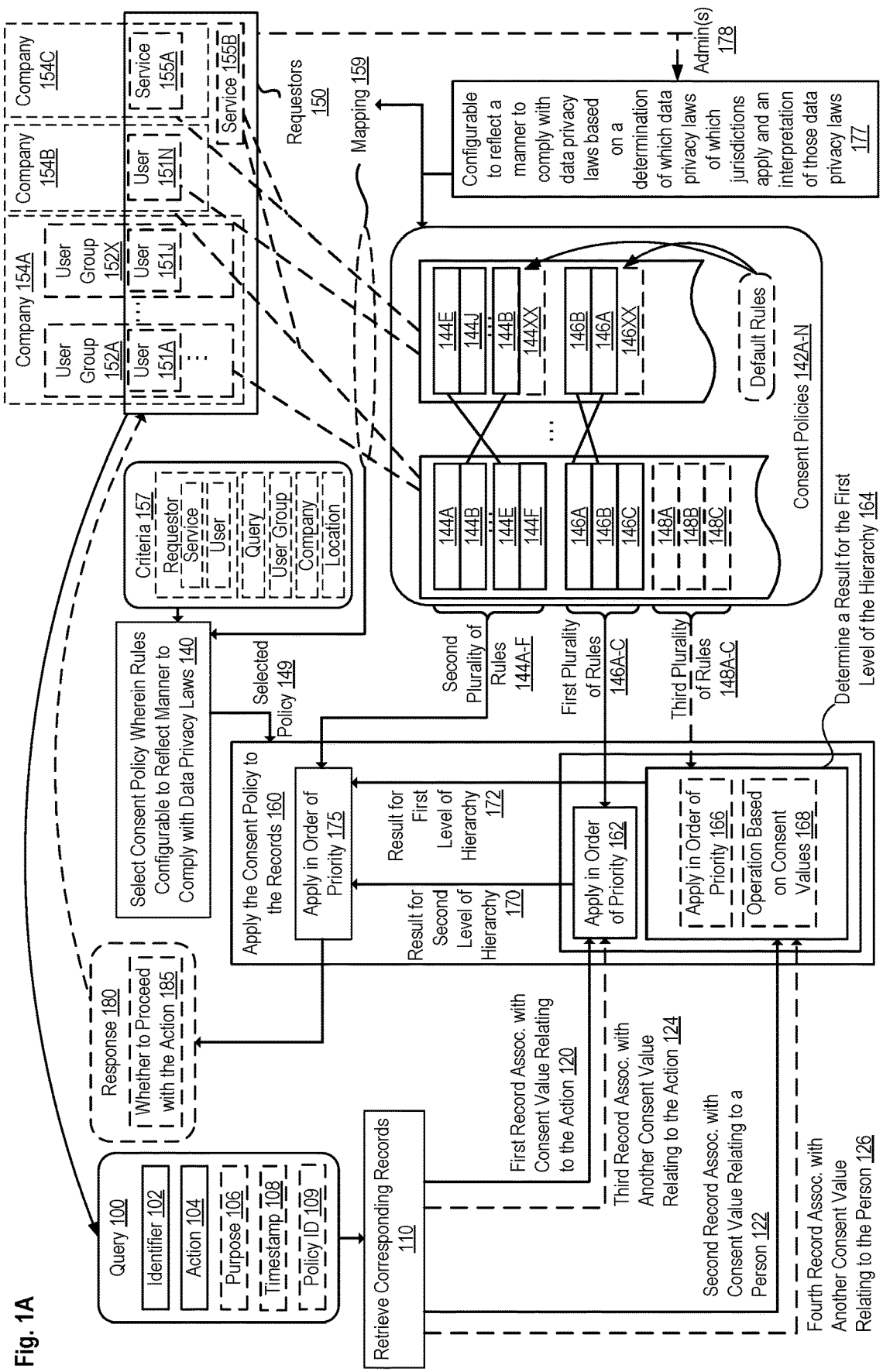
FIG. 1A is a block diagram illustrating a system and method for using consent policies to determine whether to proceed with actions relative to persons based on a hierarchy of consent values for that person, according to some example implementations.

The following description describes exemplary implementations for determining consent for an action using a consent policy reflecting a determination of applicable data privacy laws. The implementations include the use of consent policies to determine whether to proceed with actions relative to persons based on a hierarchy of consent values for that person, the hierarchy including a first level involving consent values for persons and a second level involving consent values for actions.

For example, in some implementations, responsive to a query, a corresponding plurality of records is retrieved. The records are associated with consent values pertaining to the person's consent for another entity to perform an action in view of data privacy laws. A consent policy is selected; the consent policy includes rules which are configurable to reflect a manner to comply with data privacy laws based on a determination of which such laws apply, and an interpretation of same. The consent policy is applied to the plurality of records to determine whether to proceed with the action. The applying comprises applying the first and second plurality of rules to identify results for the second and first level of the hierarchy respectively. The result for the first level of the hierarchy identifies a determination of whether to proceed with the action relative to the person. Downstream systems can then use the determination to determine whether to proceed with the action relative to the person.

Such implementations provide an improvement over conventional approaches that use hardcoded logic reflecting a hardcoded policy. For instance, as compared to conventional hardcoded approaches, some of the implementations described herein: 1) provide greater ease of configurability (e.g., to comply with different data privacy laws in different jurisdictions, to reflect different interpretations of those laws, to reflect different levels of risk tolerance, to promote a particular corporate image, to reflect different security concerns, and/or to reflect different relationships with people relative to whom action is taken (e.g., to give different levels of regard to people's privacy preferences; to reflect different people's roles or the reasons for which actions are performed relative to people, etc.)); 2) are more readily adaptable (e.g., to accommodate changes in applicable data privacy laws, their interpretation, and/or risk tolerances) and/or maintainable (e.g., to fix errors in consent policies, and/or to improve them (e.g., in terms of performance or coverage)); 3) support different consent policy preferences, especially in the context of supporting many users with different preferences (e.g., many tenants in a multi-tenant system), and for making privacy determinations for those users in bulk and at speed to facilitate downstream systems incorporating those determinations.

Different interpretations of applicable data privacy laws may reflect a relatively risk-tolerant or relatively risk-averse interpretation. A risk-averse interpretation means an interpretation which represents relatively less risk under applicable data privacy laws, while a risk-tolerant interpretation means an interpretation which represents relatively more risk. An entity subject to data privacy laws in one or more jurisdictions when dealing in or with information pertaining to a person may thus wish to interpret and/or comply with those laws in different manners, such as by taking a policy-based approach.

A consent policy is a policy configured for an entity (e.g., a service, a user, a user group to which the user belongs, a tenant, company, or division of a company to which the user or the service belongs), where the policy includes rules which reflect a manner for the entity to comply with applicable data privacy laws and an interpretation of those laws, and optionally to reflect one or more other concerns (e.g., a level of risk tolerance, promote a particular corporate image, address a particular security concern, relationships with certain people, etc.). Such concerns may also influence how the entity determines whether to proceed with an action relative to a person (e.g., whether to email a person for billing purposes; whether to telephone a person for solicitation, etc.). Specifically, a consent policy can be used to determine whether to proceed with an action relative to a person. In the context of a policy, a rule means a set of conditions that, if satisfied for a set of inputs, identifies a specified result.

FIG. 1A is a block diagram illustrating a system and method for using consent policies to determine whether to proceed with actions relative to persons based on a hierarchy of consent values for that person, according to some example implementations. The system includes requestors 150 which can submit (also referred to as issue) one or more queries such as a query 100. The requestors are comprised of zero or more users and zero or more services. The users and services may belong to zero or more companies or divisions of companies (e.g., business units (not shown)). For example, users 151A-J belong to company 154A (e.g., the users 151A-J may be employed by company 154A), user 151N belongs to company 154B, and service 155A belongs to company 154C (e.g., the service may be used by the company). Users may also belong to one or more user groups. For example, user 151A belongs to user group 152A and user 151J belongs to user group 152X. A user group may represent a group of users with a shared characteristic (e.g., the users in the group may all share a similar role at a company, or all have permission to perform a similar action such as invoicing). A given user or service need not belong to a company or division thereof, however. For example, the service 155B belongs to none of company 154A, company 154B, and company 154C. In fact, service 155B may be used by one or more of the companies 154A-C as described more fully herein. In a multi-tenant system, one or more of the companies 154A-C and/or one or more of the user groups 152A-X may be different tenants of the multi-tenant system.

The query 100 is submitted by a requestor of the requestors 150. The query includes an identifier 102 and a designation of an action 104. The query 100 may optionally include a designation of a purpose 106, a timestamp 108, and/or an identification of a consent policy 109 (also referred to as a policy ID). The identifier 102 can be used to retrieve a corresponding plurality of records 110 each associated with a consent value pertaining to a person's consent for another entity to perform the action 104 relative to the person in view of applicable data privacy laws (not shown). The optional purpose 106 is a purpose for the action 104. For example, an action may be one of email, social media, and telephone, whereas the purpose for the action may be one of marketing, billing, and customer support. Other actions and other purposes for actions are possible. The optional timestamp 108 corresponds to a date and/or time, and/or an effective time range for the consent value(s) associated with the plurality of records to be retrieved. When supported by an implementation, the optional timestamp 108 can thus be provided in a query to determine whether to proceed with the action 104 for the timestamp 108. That timestamp 108 could represent a past time (e.g., when performing an action 104 as of a past date), a current time (e.g., for performing the action 104 currently or in the immediate future), or a future time (e.g., for performing the action 104 as of a future date). The optional policy ID 109 identifies a consent policy to be used to determine whether to proceed with the action 104 for the person to whom the plurality of records corresponds.

One of skill in the art will recognize that the query 100 represents any number of forms for requesting information. For example, the query 100 could represent a call to an application programming interface (API) (e.g., via a call to a software library or via an HTTP request to a REST API). Alternatively, the query 100 could represent a request to a database which stores consent-related data and which is configured to perform the described methods. Thus, the term "query" is intended to be illustrative and not limiting; other terms could be used in the scope and spirit of the invention (e.g., the term "request" could be used).

Responsive to the query 100 in which the identifier 102 and the action 104 are provided, a corresponding plurality of records are retrieved in block 110. The corresponding records may be retrieved from one or more database objects in one or more databases (not shown in FIG. 1A). In implementations which support an optional timestamp 108, the corresponding records may be associated with one or more timestamps such that an effective time range for each record can be determined (e.g., the records may be stored in a temporal or bitemporal database). For purposes of illustration, the plurality of records includes a first record associated with a consent value relating to the action 120 and a second record associated with a consent value relating to a person 122. However, additional records may be retrieved in the plurality of records. In some implementations, a third record associated with another consent value relating to the action may be retrieved. Additionally or alternatively, a fourth record associated with another consent value relating to the person 126 may be retrieved. A third record may be retrieved, for example, in an implementation that supports consent values associated with a purpose for an action, and thus providing a purpose 106 in the query 100. In such an implementation, a person corresponding to the identifier 102 may have a consent value for an action 104 for a purpose 106, yet have one or more additional consent values for the same action 104 for other purposes (e.g., the person may consent to email contact for customer support purposes, but deny consent to email contact for marketing purposes). A fourth record may be retrieved, for example, in an implementation where some records reflect different profiles which correspond to a single person (e.g., a person may have a profile corresponding to the person's role as a user of the system, as a marketing lead or an account (e.g., in a CRM system), and/or as a contact (e.g., in an address book service)). One of skill in the art will recognize that the plurality of records retrieved in block 110 may include other records relating to other levels of a hierarchy of consent (e.g., the records may include those with consent values relating to a particular action via particular means, such as emailing via a work email address (as opposed to a personal email address)).

FIG. 1A also shows consent policies 142A-N. Each consent policy of the consent policies 142A-N includes a first plurality of rules 146A-C and a second plurality of rules 144A-F. Different ones of the consent policies 142A-N reflect different manners to comply with data privacy laws. Some implementations may include a third plurality of rules 148A-C or other pluralities of rules (not shown). The reference numbers for the pluralities of rules are illustrative and not limiting (e.g., the first plurality of rules 146A-C may include other rules 146D-N (not shown), and/or the second plurality of rules 144A-F may include other rules 144G-M (not shown)).

As shown in FIG. 1A, consent policies may share a given rule (i.e., have a given rule in common). For example, in its first plurality of rules, consent policy 142N shares rule 146A and rule 146B with consent policy 142A (albeit it that rule 146A precedes rule 146B in consent policy 142A, whereas rule 146B precedes rule 146A in consent policy 142N). Moreover, one or more of the consent policies 142A-N may include rules in one or more of the pluralities by reference. For example, in the first plurality of rules 146A-C, the rule 146A may be referenced in the consent policy 142A but stored elsewhere. Additionally or alternatively, a rule (e.g., rule 146B) may be stored in one consent policy (e.g., consent policy 142A) and then referenced in other consent policies which include that rule (e.g., consent policy 142N). Referencing a rule shared by several of the plurality of consent policies 142A-N may provide advantages such as a reduced footprint for the consent policies 142A-N (i.e., the total size of the stored policies may be reduced) and/or improved maintainability for those policies (e.g., a rule can be modified and that modification reflected in each consent policy which references that rule). In some implementations, one or more of the pluralities of rules may include a default rule. For example, the first plurality of rules of consent policy 142N optionally includes a default rule 146XX and the second plurality of rules for that policy optionally includes a default rule 144XX. Default rules are described more fully herein.

Each of the consent policies 142A-N may be shared by more than one of the requestors 150 (and thus the user groups 152A-X, the companies 154A-C, divisions thereof (not shown), and/or services (e.g., service 155B)). Consent policies may also be shared amongst tenants in a multi-tenant system (i.e., tenants have consent policies in common). Having common consent policies provides notable advantages. A consent policy is configurable to reflect a manner to comply with data privacy laws based on a determination of which data privacy laws apply and an interpretation of those laws 177. In an implementation where a vendor of a multi-tenant system configures the consent policies for the use of tenants (and thus their respective requestor(s)), the vendor can configure consent policies which are then common amongst tenants, and which reflect a shared interpretation of data privacy laws which may apply to those tenants. For example, the vendor may configure the plurality of consent policies 142A-N to represent respectively risk-averse and relatively risk-tolerant interpretations of data privacy laws. The vendor may then request each tenant of a plurality of tenants to elect, according to preference, one of the plurality of consent policies 142A-N to be applied to any requestor(s) belonging to that tenant.

Moreover, one or more of the consent policies 142A-N may be provided and/or elected by one or more administrators 178 for the companies 154A-C to whom requestors 150 belong. An administrator is a user who administers the system on behalf of an entity, or the role of such a user. A particular user (e.g., user 151A) or a person configuring a service (e.g., service 155A) may lack the expertise and/or authority to select a consent policy for the user or service's respective company (i.e., company 154A or 154C). Instead, the consent policy for the company may be provided and/or elected by a legal department at that company or more generally by one or more representatives of that company with the requisite expertise and/or authority. In such a situation, administrator(s) 178 can provide and/or elect a consent policy for use by some or all users and/or services belonging to or used by the respective companies, or one or more subsets thereof (e.g., all users in a particular user group or a particular division or business unit of that company). Providing and/or electing a consent policy in such a fashion reduces the risk that a consent policy is applied to determine how to proceed for an action relative to a person, and the determination resulting in risk (e.g., legal risk, reputational risk, security risk, etc.) for that user or the company to which the user (or service) belongs because the consent policy is an inappropriate selection.

In some implementations, an administrator 178 may (or a company may otherwise) upload a consent policy and later have the uploaded policy selected and applied to a query for a requestor belonging to the company. While in some implementations the overridden consent policy is in human-readable form (e.g., based on a natural language), in other implementations the overridden consent policy may not be in human-readable form (e.g., the overridden consent policy is in a binary and/or executable form). For example, a consent policy may be expressed as a matrix. The contents of the matrix (and thus the consent policy) may be specified in one of several different forms. For example, the contents could be specified by comma-separated values (CSV), a spreadsheet, in XML, in JSON, etc. The system shown in FIG. 1A could thus accept a policy in one of these formats, whether provided in a file (e.g., a CSV file or spreadsheet file) or as an object (e.g., JSON). An implementation could then determine, for each rule of the uploaded policy, whether the rule is included or referenced in one of the plurality of consent policies 142A-N. If the rule is so included or referenced, the rule of the uploaded policy could reference the corresponding rule in the plurality of consent policies. If the rule is not so included or referenced, a new rule could be added to a collection of rules referenced by the plurality of consent policies 142A-N. The uploaded policy could then reference that new rule.

Additionally or alternatively, in some implementations, an administrator 178 could override an existing consent policy for later selection and application. Overridden means, in relation to an existing consent policy, a policy where one or more rules have been modified, deleted, added, or disabled. In relation to a rule of a consent policy, modified means when one or more elements (also known as conditions) of the rule have been modified, deleted, added, or disabled. In some implementations, a GUI could be provided to an administrator 178. The GUI could allow the administrator 178 to elect a consent policy from the plurality of consent policies 142A-N. Additionally, the GUI could allow the administrator 178 to override a consent policy in the plurality of consent policies 142A-N (e.g., by modifying rules in, deleting (or disabling) rules from, and/or adding rules to that consent policy), and to elect that overridden consent policy.

Together with the consent policies 142A-N, FIG. 1A shows an optional mapping 159 between the consent policies 142A-N and certain entities. Specifically, FIG. 1A shows an optional association between 1) consent policy 142A and user group 152A; 2) consent policy 142A and company 154B; 3) consent policy 142N and user 151N; and 4) consent policy 142N and company 154C. This mapping 159 illustrates that, by default, consent policy 142A will be selected as selected policy 149 for queries submitted by users in user group 152A; consent policy 142A will be selected as selected policy 149 for the queries submitted users and/or services belonging to company 154B; consent policy 142N will be selected as selected policy 149 for the queries submitted by user 151N; and consent policy 142N will be selected as selected policy 149 for the queries submitted by users and/or services belonging to company 154C (e.g., service 155A). Additional mappings are also possible (e.g., in addition to the default of selecting consent policy 142A for company 154B, consent policy 142N may be selected as selected policy 149 for user 151N belonging to company 154B).

Service 155B does not belong to any of companies 154A-C. However, service 155B may be used by one or more such companies and/or by the provider of a multi-tenant system as described in more detail below. If the service 155B needs to determine whether to proceed with an action relative to a person (e.g., to include information pertaining to that person in log records), the consent policy mapping for companies 154B-C will be selected as appropriate for service 155B, as shown by the dashed lines between service 155B and 1) the mapping between company 154B and consent policy 142A, and 2) the mapping between company 154C and consent policy 142N, respectively. Thus, a service such as service 155B may be used by a plurality of companies, and in using the service, the appropriate consent policies for those companies will be selected.

The optional mapping 159 could be implemented in various ways. In some implementations the mapping 159 is implemented as a data structure which stores values associated with keys (e.g., a map or tree). In such implementations, a key corresponding to a user is mapped to a user group (if a user group exists for the user), which in turn is mapped to a division of a company (if the user belongs to a division of a company), which in turn is mapped to a company (if the user belongs to a company); similarly for a service. The selected policy 149 can then be selected for a user by looking-up the entry in the map data structure which corresponds to that user (including, as necessary, looking-up corresponding entries for any user group, division, and/or company). As evident to one of ordinary skill in the art, other implementations for optional mapping 159 are possible (e.g., hashtables with composite keys, flattened maps, etc.).

Block 140 shows selecting a consent policy from the plurality of consent policies 142A-N. The selection of a consent policy is based on a current set of one or more criteria 157. The current set of criteria optionally includes one or more of 1) a requestor submitting the query 100 (e.g., a service or a user); 2) information provided with the query 100 itself (e.g., the action 104 and/or the policy ID 109); 3) a user group to which a user submitting the query 100 belongs (e.g., user group 152A in the case of user 151A); 4) a company to which a user or service submitting the query belongs (e.g., company 154A in the case of user 151A); 5) a location for the person (i.e., the person to whom the corresponding records relate, retrieved in block 110). Where the current set of criteria 157 include a given criterion, the optional mapping 159, if used, should include that criterion to facilitate resolving the mapping 159 for that criterion. For example, if a location or the information in the query 100 is included in the current set of criteria 157, the location or the information in the query 100 should be referenced in the mapping 159 (not shown in the case of location or query information being included). In block 140, selecting a currently selected consent policy 149 can then be based on the current set of criteria 157 and the optional mapping 159.

In block 160, the currently selected consent policy 149 is applied to the plurality of records to determine whether to proceed with the action. Specifically, the consent policy's first plurality of rules 146A-C is applied in order of priority 162 to the first record associated with a consent value relating to the action 120. The first plurality of rules 146A-C is applied to find a rule based on a condition of the rule being met by that consent value, as described more fully herein. If a rule is found, the rule identifies a result for the second level of the hierarchy of consent values 170 (e.g., corresponding to the person's consent pertaining to the action). In some implementations, if a rule is not found, then a default rule is applied to identify such a result 170. In implementations which support a third record associated with another consent value relating to the action 124, if a rule is not found, then the first plurality of rules 146A-C for the selected policy 149 is applied in order of priority to the third record to find a rule identifying a result for the second level of the hierarchy 170. Such implementations may also apply a default rule if no rule is found in the first plurality of rules 146A-C for the first record and the third record. A default rule will typically be configured such that its conditions are always met. Thus, use of a default rule will ensure that a rule is always found. One of skill in the art will recognize that other implementations are possible (e.g., an error message may be returned in the response 180 to the query 100, where the error message indicates that no rule was found whose condition was met by the first record 120 or in some implementations, first record 120 and third record 124).

In block 164, a result for the first level of the hierarchy 172 is determined. Some implementations optionally include block 166. In block 166, determining a result for the first level of the hierarchy includes applying in order of priority the consent policy's third plurality of rules 148A-C to the second record 122 and/or an optional fourth record 126 to find yet another rule that identifies a result for the first level of the hierarchy 172. In other implementations, a consent value (e.g., the consent value associated with the second record 122 or optional fourth record 126) may indicate a result for the first level for the hierarchy 172. In yet other implementations, block 164 may include performing an operation to determine the result for the first level of the hierarchy 172, where the result is based on the consent values associated with both a second record 122 and the optional fourth record 126. Implementations may thus cater for situations where consent values relating to the person are associated with several records (e.g., in different database objects). This may occur when records reflect different profiles which correspond to a single person; e.g., a person may have a profile corresponding to the person's role as a user of the system, as a marketing lead or an account (e.g., in a CRM system), and/or as a contact (e.g., in an address book service). Determining a result for the first level of the hierarchy 172 may thus require resolving different consent values associated with records corresponding to each such role (e.g., the record corresponding to the person as a user may indicate one consent value relating to the action 104, while the record corresponding to the person as a lead may indicate a conflicting consent value relating to that action 104). For example, in block 168, the operation based on the consent values may include mapping the consent values to Boolean values (i.e., true or false), and then performing a logical AND operation on those Boolean values. Alternatively, more complex schemes and/or operations could be envisaged. Implementations could also support a configurable operation which is expressed in the selected policy 149 (e.g., in a formula language).

In block 175, the consent policy's second plurality of rules 144A-F is applied in order of priority to find another rule based on the respective conditions of that rule being met by the result for the first level of the hierarchy 172 and the result for the second level of the hierarchy 170. If found, that rule identifies a result that indicates whether to proceed with the action 185. If a rule is not found, some implementations may apply a default rule (not shown) to identify whether to proceed 185. Other implementations could be envisaged (e.g., an error message may be returned in the response 180 to the query 100, where the error message indicates that no rule was found whose condition was met by the results for the first and second levels of the hierarchy). Optionally, responsive to applying the second plurality of rules 144A-F, a response 180 with the determination of whether to proceed with the action 185 is provided.

FIG. 1B is a flow diagram illustrating a method for selecting a consent policy, retrieving a plurality of records associated with consent values, and applying the currently selected consent policy to those records, according to some example implementations.

Responsive to a query in which an identifier and an action are provided 105, in block 110, a corresponding plurality of records which include a first and second record each associated with a consent value respectively relating to the action and to a person are retrieved, wherein the consent value, the action, and the person pertain to the person's consent for another entity to perform the action in view of data privacy laws. With reference to FIG. 1A, the plurality of records includes the first record associated with a consent value relating to the action 120 and the second record associated with a consent value relating to the person 122. In some implementations, these records are associated with a consent value in that the consent value is stored in the respective records (e.g., as a field in those records). In other implementations, the records are associated with a consent value which is not stored in the respective records (e.g., the consent values are stored elsewhere, are determined as needed, etc.).

In some implementations, responsive to the query in which an identifier and an action are provided 105, block 140 is executed. In block 140, a consent policy is selected (with reference to FIG. 1A, the selected policy 149).

In some implementations, responsive to block 105, block 140 and block 110 are executed in parallel or substantially in parallel. However, in other implementations, blocks 140 and 110 are executed sequentially (e.g., block 140 is executed before or after block 110 is executed). In implementations where block 140 is executed after block 110 (i.e., the selecting a consent policy occurs after the retrieving the corresponding plurality of records), the current set of criteria 157 may be based on information from or associated with the plurality of records. For example, the plurality of records may be associated with a location for the person relative to whom whether to proceed with the action is being determined. Applicable data privacy laws may depend on the person's location. Thus, the location in criteria 157 may be relevant to selecting the consent policy 140. For another example, citizenship of the person may be relevant. Again, retrieving the corresponding plurality of records may permit using citizenship information for the person as part of the current set of criteria 157 on which the selecting the consent policy 140 is based (if the plurality of records retrieved are associated with such citizenship information).

In yet other implementations, a consent policy 149 is selected before the query in which an identifier and an action are provided 105. In such implementations, the consent policy 149 is selected based on a set of criteria 157 which does not include information in the query. For example, the selecting the consent policy 140 may occur before a requestor's submission of the query, wherein the current set of criteria is based on information associated with credentials used to authenticate the requestor. In implementations where the query 100 is a call to a REST API, token-based authentication may be used. In token-based authentication, an authenticated requestor is provided with a token. The requestor may then use the token in later calls to the REST API. So long as the token remains valid, the later calls may not require additional authentication of the requestor. Also, information pertaining to the requestor may be determined from the token in such later calls. Thus, where token-based authentication is used, the criteria 157 may be based on one or more of a service, a user, a user group to which the user belongs, and/or a tenant, company, or division of a company to which the user or the service belongs, where that information is obtained directly or indirectly from the token (e.g., from the token itself; from the token and an account associated with the user or service, from the token and other sources of information regarding the user or service, etc.). Selecting the consent policy 140 before the query in which an identifier and an action are provided 105 may provide advantages. For example, a user or service may submit many queries in a session for the user or service. Selecting the consent policy before submission of the queries may offer performance benefits relative to selecting the consent policy after each submission of a query.

From blocks 110 and 140, flow passes to block 160. In block 160, the currently selected consent policy is applied to the plurality of records to determine whether to proceed with the action. The application of the currently selected consent policy includes block 162, which includes applying the first plurality of rules in order of priority to find a rule based on the condition of the rule being met by the consent value relating to the action in the first record, wherein the rule identifies a result for the second level of the hierarchy. As previously mentioned, in some implementations, a rule may not be found when applying the first plurality of rules, and optionally in block 169, a default rule applied to identify the result for the second level of the hierarchy.

From block 162, flow passes to block 164. In block 164, a result for the first level of the hierarchy is determined using the consent value associated with the second record. From block 164, flow passes to block 175.

In block 175, the second plurality of rules is applied in order of priority to find another rule based on its respective conditions being met by the result for the first and second levels of the hierarchy. This rule identifies whether to proceed with the action relative to the person. In some implementations, a default rule is applied in block 179 for (i.e., in place of) this rule to identify whether to proceed with the action if such a rule is not found.

Although some implementations have been discussed herein with reference to FIG. 1B, other implementations discussed with regard to FIG. 1A equally apply to FIG. 1B (and vice versa).

FIG. 1C is a flow diagram illustrating an exemplary way for responding to a query with a determination of whether to proceed, according to some example implementations. In these implementations, responsive to applying the second plurality of rules in block 175, optionally the query 100 is responded to (e.g., with an optional response 180) with the determination of whether to proceed with the action relative to the person.

Figure 2A:
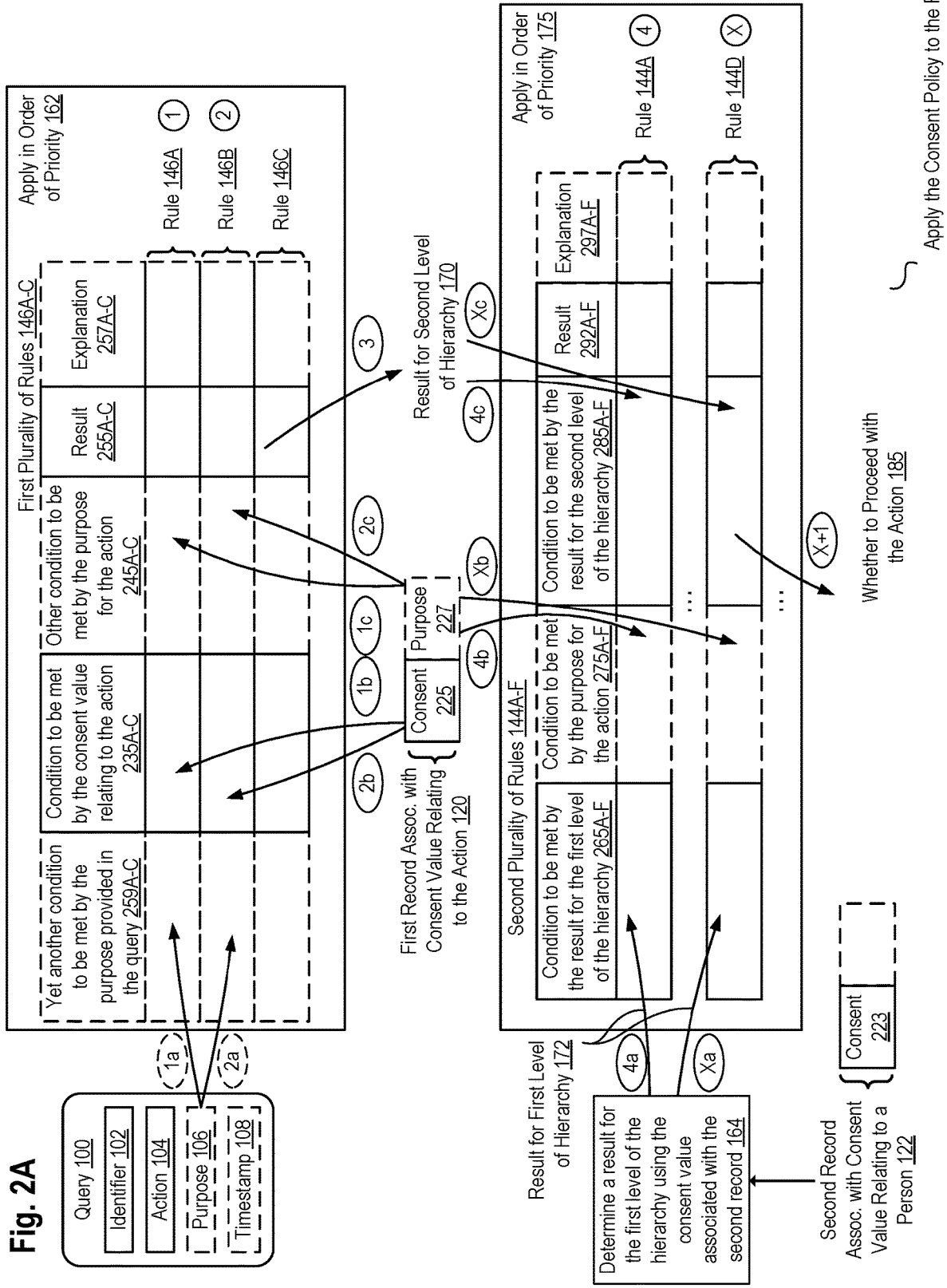
FIG. 2A is a more detailed block diagram to illustrate applying the selected consent policy to records associated with consent values, according to some example implementations.

FIG. 2A is a more detailed block diagram to illustrate applying the selected consent policy to records associated with consent values, according to some example implementations.

With reference to FIG. 1A, the first plurality of rules 146A-C include a condition to be met by the consent value relating to the action 235A-C, and indicate a result for the second level of the hierarchy 255A-C. Optionally, the first plurality of rules 146A-C include 1) another condition to be met by the purpose for the action 245A-C; 2) yet another condition to be met by the purpose provided in the query 259A-C; and/or 3) an explanation for the result 257A-C. In block 162, the first plurality of rules 146A-C is applied in order of priority. For purposes of illustration, rule 146A is first applied to the first record associated with a consent value relating to the action 120, as indicated with circular reference 1. Specifically, at 1a, in some implementations the purpose 106 of the query 100 is compared to yet another condition 259A. In implementations which support yet another condition 259A, if that condition is met by optional purpose 106, then further elements of rule 146A are compared. At 1b, the consent value 225 associated with the first record 120 is compared to the condition 235A of rule 146A. If that condition is met by the consent value 225, further elements of rule 146A are compared (otherwise, a rule following rule 146A in order of priority may be applied). Specifically, in implementations which support the other condition 245A-C, at 1c the optional purpose for the action 227 associated with the first record 120 is compared to another condition 245A. If that condition is met by the purpose for the action 227, then the result for the second level of the hierarchy 170 would be identified by the result 255A. However, in the example shown in FIG. 2A, another condition 245A is not met by the optional purpose for the action 227. Thus, rule 146B is applied at circular reference 2.

Specifically, at 2a, the purpose 106 of the query 100 is compared to yet another condition 259B in some implementations. In such implementations, if yet another condition 259B is met by optional purpose 106, then further elements of rule 146B are compared (otherwise, the rule following rule 146B in order of priority may be applied). At 2b, the consent value 225 associated with the first record 120 is compared to the condition 235B of rule 146B. If that condition is met by the consent value 225, further elements of rule 146B are compared (otherwise, the following rule is applied). Specifically, in implementations which support the other condition 245A-C, at 2c the optional purpose for the action 227 associated with the first record 120 is compared to another condition 245B. If the other condition is not met by the purpose for the action 227, then the rule 146C would be applied. However, in the example shown in FIG. 2A, the other condition 245A is met by the optional purpose for the action 227. Thus, at circular reference 3, the rule 146B identifies the result for the second level of the hierarchy 170 with the result 255B. Flow then passes from block 162 to block 164 in some exemplary implementations.

In block 164, a result for the first level of the hierarchy 172 is determined using the consent value relating to a person 223 associated with the second record 122. Flow passes to block 175.

With reference to FIG. 1A, the second plurality of rules 144A-F include a condition to be met by the result for the first level of the hierarchy 265A-F, a condition to be met by the result for the second level of the hierarchy 285A-F, and indicate whether to proceed with the action relative to the person 292A-F (shown by the column labeled "Result"). Optionally, the second plurality of rules 144A-F include a condition to be met by the purpose for the action 275A-F; and/or an explanation for whether to proceed with the action relative to the person 297A-F. In block 175, the second plurality of rules 144A-F is applied in order of priority to the result for the first level of the hierarchy 172 and to the result for the second level of the hierarchy 170. For purposes of illustration, rule 144A is first applied at circular reference 4.

Specifically, at 4a a condition to be met by the result for the first level of the hierarchy 265A for rule 144A is compared to the result for the first level of the hierarchy 172. The condition 265A is met by the result 172, and further elements of rule 144A are compared. Specifically, in implementations which support the condition to be met by the purpose for the action 275A-F, at 4b the optional purpose for the action 227 associated with the first record 120 is compared to the condition 275A. If the condition 275A is met by the purpose for the action 227 (or if an implementation does not support conditions 275A-F), then further elements of rule 144A are applied. Specifically, at 4c the result for the second level of the hierarchy 170 is compared to the condition to be met by the result for the second level of the hierarchy 285A. In the example shown in FIG. 2A, the condition 285A is not met by the result of the second level of the hierarchy 170. Thus, the rule following rule 144A in order of priority is applied.

At circular reference X, rule 144D is applied. Specifically, at Xa the result for the first level of the hierarchy 172 is compared to the condition to be met by the result for the first level of the hierarchy 265D. The condition 265D is met by the result for the first level of the hierarchy 172, and further elements of rule 144D are compared. Specifically, in implementations which support the condition to be met by the purpose for the action 275A-F, at Xb the optional purpose for the action 227 associated with the first record 120 is compared to the condition 275D. If the condition 275A is met by the purpose for the action 227 (or if an implementation does not support conditions 275A-F), then further elements of rule 144D are applied. Specifically, at Xc the result for the second level of the hierarchy 170 is compared to the condition to be met by that result 285D. In the example shown in FIG. 2A, the condition 285A is met by the result of the second level of the hierarchy 170. Thus, at circular reference X+1, the rule 144D identifies whether to proceed with the action relative to the person 185.

It should be noted that the order of priority shown in FIG. 2A is such that rule 146A is applied before rule 146B is applied, which in turn is applied before rule 146C would be applied. Also, rule 144A is applied before rule 144D is applied. Put differently, the order of priority is shown in FIG. 2A by the reference numbers for the rules and the circular references used to indicate an exemplary sequence. An order of priority may be implemented various ways. In some implementations, the order of priority may be expressed by the ordering of the rules in the first plurality of rules 146A-C, and by the ordering of the rules in the second plurality of rules 144A-F. For example, if the rules of each of the first and second plurality of rules are referenced in the selected consent policy (referring back to FIG. 1A, in selected policy 149), then the order that the respective rules are referenced may indicate an order of priority for the rules (e.g., the rules may be referenced in an ordered data structure such as a linked list). In implementations where the policy is stored in the form of a matrix, a number associated with each row of the matrix (where each row represents a rule) may indicate order of priority for the rules. In other implementations, a priority may be stored in each rule of the first and second pluralities, and those rules sorted or searched (e.g., the first plurality of rules are sorted or partially sorted before being applied; the second plurality of rules are sorted or partially sorted before being applied; etc.). Other implementations are possible. However, if more than one rule has the same priority, the order of priority for the rules will not necessarily be unique. When the order is not unique, the rule which is found in a plurality of rules may change depending on the order, giving inconsistent results (because a different rule may be found and thus a different result identified depending on the order in which the rules are applied).

FIG. 2B is a more detailed flow diagram to illustrate a applying a first and second plurality of rules of a consent policy to records associated with consent values, according to some example implementations. Blocks 160, 164, and 175 are discussed elsewhere herein.

In block 162, the first plurality of rules is applied in order of priority. Applying the first plurality of rules optionally includes determining if more rules in the first plurality of rules are to be applied 210. If more rules are to be applied (indicated by the label "YES"), flow passes to block 220. If no more rules are to be applied (indicated by the label "NO"), flow optionally passes to optional block 169. Block 169 is discussed elsewhere.

In block 220, a next rule to be applied is selected from the first plurality of rules in order of priority. As discussed, the order of priority may be implemented in different ways. How a next rule is selected in order of priority may depend on the way the order of priority is implemented. For example, selecting the next rule may include finding a next element in an ordered data structure, finding a next row in a matrix, or sorting/searching an unordered data structure. When a next rule is selected, flow passes from block 220 to block 230.

In block 230, a determination is made whether a condition of the selected rule is met by the consent value relating to the action. Thus, referring back to FIG. 2A, a determination is made whether a condition (e.g., a condition to be met by the consent value relating to the action 235A-C) of the selected rule (e.g., a given one of the rules 146A-C) is met by the consent value relating to the action (e.g., consent value 225). For example, the consent value of the first record may be compared to the condition to determine whether the condition is met. Alternatively, a function associated with the condition may be called with the consent value passed as a parameter, and the function return a value indicated whether the condition is met. Additionally or alternatively, implementations may also determine in block 230 whether another condition of the selected rule is met by the purpose for the action and/or whether yet another condition of the selected rule is met by the purpose provided in the query. If the condition(s) are met (indicated by the label "YES"), flow passes to block 240 in which the rule of the first plurality of rules is found. If the condition(s) are not met (indicated by the label "NO"), flow passes to block 210.

In block 175, the second plurality of rules is applied in order of priority. Applying the second plurality of rules optionally includes determining if more rules in the second plurality of rules are to be applied 260. If more rules are to be applied (indicated by the label "YES"), flow passes to block 270. If no more rules are to be applied (indicated by the label "NO"), flow optionally passes to optional block 179. Block 179 is discussed elsewhere.

In block 270, a next rule to be applied is selected from the second plurality of rules in order of priority. Flow passes from block 270 to block 280.

In block 280, a determination is made whether a condition of the selected rule is met by the results for the first and second levels of the hierarchy. Thus, referring back to FIG. 2A, a determination is made whether 1) a condition (e.g., a condition to be met by the result for the first level of the hierarchy 265A-F) of the selected rule (e.g., a given one of rules 144A-F) is met by the result for the first level of the hierarchy; and 2) a condition (e.g., a condition to be met by the result for the second level of the hierarchy 285A-F) is met by the result for the second level of the hierarchy. Some implementations may also determine in block 280 whether the condition of the selected rule (e.g., condition to be met by the purpose for the action 275A-F in FIG. 2A) is met by the purpose for the action (e.g., purpose 227). If the conditions are met (indicated by the label "YES"), flow passes to block 295 in which the rule of the second plurality of rules is found. If the conditions are not met (indicated by the label "NO"), flow passes to block 260.

FIG. 3A is a table illustrating exemplary rules to be applied to records associated with consent values relating to an action, where the rules identify a result for a second level of a hierarchy of consent values, according to some example implementations. The table shows an exemplary first plurality of rules 346A-H optionally including a default rule 346XX. Each of the rules includes a condition to be met by the consent value relating to the action 335 and identifies a result 355 for the second level of the hierarchy. Optionally, each rule in the first plurality of rules 346A-H includes another condition to be met by the purpose for the action 345; yet another condition to be met by the purpose provided in the query 359; and/or an explanation 357 of the result for the second level of the hierarchy. The text in each element of rules 346A-H is explained in more detail in FIGS. 3B-E.

FIG. 3B is a table illustrating exemplary values for a condition of a rule to be applied to records associated with consent values relating to an action, according to some example implementations. As shown in the first row of the table, a condition element with a value of "OPT-OUT NON-SPECIFIC PURPOSE" will be met by a consent value of "opt-out" when the consent value is not associated with a purpose for the action. As shown in the second row of the table, a condition element with a value of "OPT-OUT SPECIFIC PURPOSE" will be met by a consent value of "opt-out" when the consent value is associated with a specific purpose. As shown in the third row of the table, a condition element with a value of "OPT-IN NON-SPECIFIC PURPOSE" will be met by a consent value of "opt-in" when the consent value is not associated with a purpose. As shown in the fourth row of the table, a condition element with a value of "OPT-IN SPECIFIC PURPOSE" will be met by a consent value of "opt-in" when the consent value is associated with a specific purpose. As shown in the fifth row of the table, a condition element with a value of "SEEN" will be met by a consent value of "seen". As shown in the sixth row of the table, a condition element with a value of "NOT SEEN" will be met by a consent value of "not seen". As shown in the seventh row of the table, a condition element with a value of "[null]" means the absence of a value for the condition, which will be met by any consent value (e.g., a value of "opt-out", "opt-in", "seen", "not seen", "unknown", etc.).

FIG. 3C is a table illustrating exemplary values for another condition of a rule to be applied to records associated with consent values relating to an action, according to some example implementations. As shown in the first row of the table, another condition element with a value of "ANY OR NO PURPOSE" will be met by any purpose if a purpose is associated with a consent value relating to an action, or if no purpose is associated with the consent value relating to an action. As shown in the second row of the table, another condition element with a value of "PASSED PURPOSE" will be met if a purpose is associated with a consent value relating to an action and that purpose is a purpose provided in the query. Notably, in implementations where a purpose is not provided in a query, another condition element with a value of "PASSED PURPOSE" will never be met. As shown in the third row of the table, another condition element with a value of "[null]" means the absence of a value for the condition, which will be met by any purpose.

FIG. 3D is a table illustrating exemplary values for yet another condition of a rule to be applied to records associated with consent values relating to an action, according to some example implementations. As shown in the first row of the table, a yet another condition element with a value of "[null]" means the absence of a value for the condition, which will be met by any purpose or by the absence of a purpose provided in a query. In contrast, as shown in the second row of the table, a yet another condition element with a value of "NO SPECIFIC PURPOSE" will be met if no purpose is provided in a query.

FIG. 3E is a table illustrating exemplary values for an explanation of the result of a rule to be applied to records associated with consent values, according to some example implementations. The explanation element 357 of a rule is optional, as discussed elsewhere. In implementations which include an explanation element 357, the value for the element is associated with and provides more information regarding the result identified by the rule. For example, as shown in the first row of the table, an explanation with value "SUCCESS" indicates that the rule identified the result definitively (i.e., that the manner in which the condition(s) of the rule were matched suggest little or no ambiguity in the result identified by the rule). Referring back to FIG. 3A, rule 346D has an optional explanation 357D with a value of "SUCCESS" because rule 346D is found when at least the condition with value "OPT-IN NON-SPECIFIC PURPOSE" is met (e.g., by a consent value of "opt-in"). Put differently, no ambiguity exists when rule 346D is found because the condition "OPT-IN NON-SPECIFIC PURPOSE" is clearly met by a consent value of "opt-in".

Similarly, as shown in the second row of the table, an explanation with value "EXPLICIT SUCCESS" indicates that the rule identified the result definitively, based on an unambiguous consent value. Referring back to FIG. 3A, rule 346A has an optional explanation 357A with a value of "EXPLICIT SUCCESS" because rule 346A is found when at least the condition with value "OPT-OUT NON-SPECIFIC PURPOSE" is met (e.g., by a consent value of "opt-out"). Put differently, no ambiguity exists when rule 346A is found because the condition "OPT-OUT NON-SPECIFIC PURPOSE" is clearly met by a consent value of "opt-out."

An explanation value of "EXPLICIT SUCCESS" differs from an explanation value of "SUCCESS" in that "EXPLICIT SUCCESS" indicates finality to the result. In the system and methods described, results are determined for different levels of a hierarchy of consent values. As discussed, a second plurality of rules is applied to the results for the first and second levels of the hierarchy. A result for the first level of the hierarchy may suggest a determination of whether to proceed with an action; a result for the second level of the hierarchy may suggest a conflicting determination of whether to proceed with that action. An explanation value of "EXPLICIT SUCCESS" indicates that the result identified by the rule should dominate if the result conflicts with a result at another level of the hierarchy of consent values, or if a result at another level of the hierarchy cannot be determined or found (e.g., due to an error). In contrast, an explanation value of "SUCCESS" does not suggest that the result identified by the rule should so dominate. In some implementations where an explanation value is used, a value of "EXPLICIT SUCCESS" can thus be used to optimize applying a selected consent policy to the plurality of records retrieved corresponding to an identifier in a query. Specifically, when a rule is found which identifies a result associated with an optional explanation value of "EXPLICIT SUCCESS", application of one or more pluralities of rules at other level(s) of the hierarchy of consent values need not occur. For example, referring back to FIG. 2B, if in block 162 a rule is found 240 where the optional explanation value of "EXPLICIT SUCCESS", execution of blocks 164 and 175 need not occur and the result identified by the rule found in block 240 identifies whether to proceed with the action.

Referring back to FIG. 3E, as shown in the third row of the table, an explanation with value "NO SPECIFIC PURPOSE" indicates ambiguity in the result identified by the rule. For example, with reference to FIG. 3A, rule 346F has an optional explanation 357F with a value of "NO SPECIFIC PURPOSE" because rule 346F is found when at least the condition 335F with value "OPT-IN SPECIFIC PURPOSE" is met (e.g., by a consent value of "opt-in" when the consent value is associated with a purpose) because the consent value resulting in the condition being met may be associated with 1) a different purpose than that optionally specified in the query (and thus the consent value may not correspond with the purpose specified in the query), or 2) a purpose, whereas the query does not specify a purpose (and thus the consent value is for a finer level of granularity than the action provided in the query). Put differently, ambiguity may exist when rule 346F is found.

As shown in the fourth row of the table, an explanation with value "INFO NOT FOUND" indicates that the consent value or lack of consent value is insufficient for the rule to identify an affirmative result. Referring back to FIG. 3A, rule 346G has an optional explanation 357G with a value of "INFO NOT FOUND" because rule 346G is found when at least the condition with value "SEEN" is met (e.g., by a consent value of "seen"). A consent value of "seen" may arise when a person has been requested to provide a consent value but has not responded to the request (e.g., the person has acknowledged but not responded to a message asking for the person's consent pertaining to an action). Thus, a consent value of "seen" can be interpreted as implicit consent and/or ambiguous. Put differently, when rule 346G is found, the result identified by rule 346G is implicit and/or ambiguous because insufficient information pertaining to consent exists.

Thus, the optional explanation element of rules provide additional information associated with the result element of those rules. This additional information can be used in some implementations for purposes of optimization. Additionally or alternatively, the additional information can be used for purposes of enriching conditions expressed in rules. For example, a condition of a rule could have a value such that determining whether the condition is met is based on both a result for another level of the hierarchy of consent values and on the explanation for that result. Further examples of using the additional information in this way are provided in FIGS. 4C-D.

FIG. 3F is a table illustrating exemplary rules to be applied to records associated with consent values relating to a person and to results for a second level of a hierarchy of consent values, according to some example implementations. The table shows an exemplary second plurality of rules 344A-N including an optional default rule 344XX. Each of the rules includes a condition to be met by the result for the second level of the hierarchy 365, a condition to be met by the result for the first level of the hierarchy 385, and identifies a result 392 (that result representing a determination of whether to proceed with the action relative to the person). Optionally, each rule in the second plurality of rules 344A-N includes a condition to be met by the purpose for the action 375 and/or an explanation 397 of the determination of whether to proceed.

Certain values in the elements of the second plurality of rules 344A-N are explained as follows. Referring to the condition 365, a value of "UNKNOWN" means that a consent value cannot be determined for the action (e.g., the person has not provided or denied consent, the consent value is implicit and/or ambiguous, and/or an error occurred in retrieving a consent value). A value of "OPT-IN" means the person has provided consent (explicitly or implicitly), while a value of "OPT-OUT" means the person has denied consent (explicitly or implicitly). A value of "NOT SEEN" means the person has been requested to provide an indication of consent but the person may not have seen the request. A value of "SEEN" means that the person has seen such a request (e.g., the person acknowledged and/or dismissed the request but did not provide an indication of consent). The value "[null]" means an absence of a value for the condition, which will be met by any result for the second level of the hierarchy, or an absence of a result. Referring to the optional condition 375, the value of "[null]" means the absence of a value for the condition, which will be met by any purpose. A value of "NON MATCHING PURPOSE" means that the purpose associated with the consent value relating to the action does not match the optional purpose provided in the query. Referring to the condition 385, the values have the same meanings as those referenced in relation to condition 365.

Referring to the result 392 (i.e., determination of whether to proceed with the action relative to the person), a value of "FALSE" indicates that the requestor should not proceed with the action relative to the person; a value of "TRUE" indicates that the requestor may proceed. These indications are relative to the selected consent policy which includes the second plurality of rules 344A-N. Put differently, the second plurality of rules exemplified in FIG. 3F reflect a manner to comply with data privacy laws based on a determination of which data privacy laws of which jurisdictions apply and on an interpretation of those data privacy laws. Moreover, the consent policy that includes the second plurality of rules 344A-N may represent a relatively risk-tolerant or relatively risk-averse interpretation of data privacy laws (and/or of which data privacy laws apply). Thus, an indication that the requestor should not or may proceed with an action relative to a person are relative to the selected consent policy and the second plurality of rules (and thus which laws may apply, an interpretation thereof, and/or a risk tolerance).

Figure 4A:
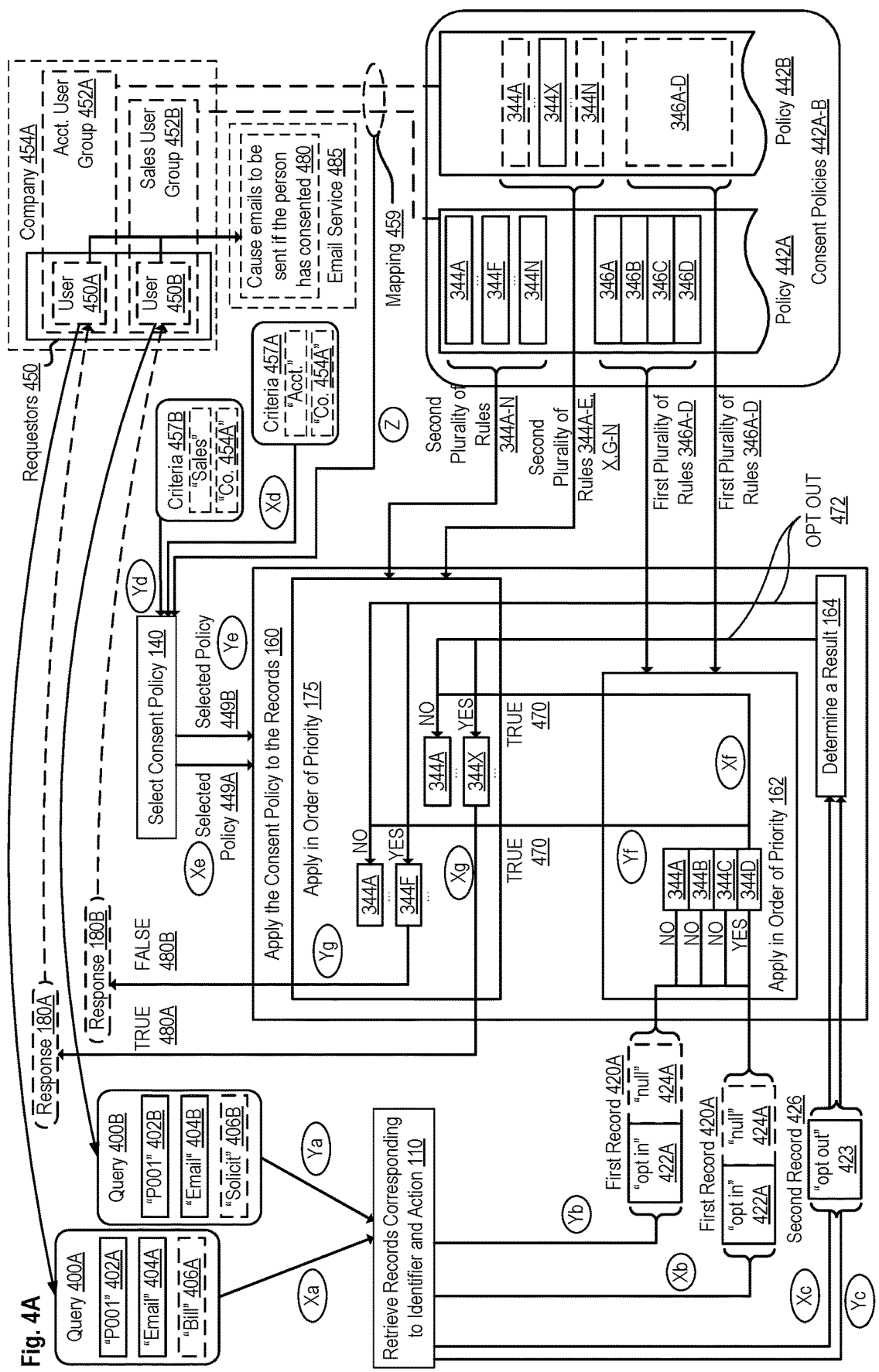
FIG. 4A is a block diagram illustrating exemplary ways for applying consent policies to determine whether to proceed with actions relative to persons, according to some example implementations.

FIG. 4A is a block diagram illustrating exemplary ways for applying consent policies to determine whether to proceed with actions relative to persons, according to some example implementations.

FIG. 4A shows a company 454A which includes an accounting user group 452A and a sales user group 452B. Accounting user group 452A includes user 450A; sales user group 452B includes user 450B. Users 450A and 450B comprise requestors 450. At Xa, user 450A submits query 400A and at Ya, user 450B submits query 400B.

The query 400A submitted by user 450A represents a question whether to proceed with an action of emailing (indicated in the field 404A) for the purpose of billing (indicated in the field 406A) relative to a person identified by the identifier "P001" (indicated in field 402A). In contrast, the query 400B submitted by user 450B represents a question whether to proceed with an action of emailing (indicated in the field 404B) for the purpose of soliciting (indicated in the field 406B) relative to the same person identified in query 400A (identified in field 402B).

In block 110, a plurality of records corresponding to the action (e.g., "Email" 404A) and the person (e.g., identified by "P001" 402A) are retrieved. Specifically, at Xb a first record 420A relating to the action is retrieved. At Xc a second record 426 relating to the person is retrieved. In block 110 at Yb and Yc the same records 420A and 426 are retrieved corresponding to the action ("Email" 404B) and the person (identified by "P001" 402B) provided in the query 400B. The first record 420A is associated with a consent value ("opt in" 422A) relating to the action and a purpose ("null" 424A) to which that consent value pertains. The consent value ("opt-in") and the purpose ("[null]") together indicate that the person identified by the identifier "P001" has indicated that the person consents to emailing (i.e., the action "Email" 404A and "Email" 404B) and that the consent is not associated with a purpose (i.e., the purpose "[null]" 424A). The second record 426 is associated with a consent value ("opt out" 423) relating to the person. The consent value indicates that the person identified by the identifier "P001" has globally denied consent.

At Xd, a consent policy is selected based on a current set of one or more criteria 457A. Criteria 457A includes a field "Acct." which corresponds to an identifier for the accounting user group 452A, and a field "Co. 454A" which corresponds to an identifier for the company 454A. The mapping 459 shows that the accounting user group 452A of company 454A is associated with a consent policy 442B. Thus, in block 140 a currently selected consent policy 449A is selected at Xd based on the criteria 457A and the mapping 459. Specifically, the criteria 457A and the mapping 459 are used to select the consent policy 442B as selected policy 449A in the context of the query 400A.

In contrast, at Yd a consent policy is selected based on a current set of one or more criteria 457B. Criteria 457B includes a field "Sales" which corresponds to an identifier for the sales user group 452B, and a field "Co. 454A" which corresponds to an identifier for the same company 454A. The mapping 459 shows that the sales user group 452B is associated with a consent policy 442A (compared to the accounting user group which is associated with the consent policy 442B). Thus, in block 140 at Yd the consent policy 442B is selected as selected policy 449B based on the criteria 457A and the mapping 459 in the context of the query 400B.

At Xe in block 160, selected policy 449A (i.e., consent policy 442B) is applied to the plurality of records retrieved at Xb and Xc (i.e., the first record 420A and the second record 426). In contrast, at Ye in block 160, selected policy 449B (i.e., consent policy 442A) is applied to those records.

Consent policy 442A includes a first plurality of rules 346A-D which consent policy 442B also includes. The dashed box marked by 346A-D in consent policy 442B indicates that the first plurality of rules 346A-D may be included in consent policy 442B by reference, or that consent policy 442B is defined in terms of its differences with consent policy 442A (and that the first plurality of rules 346A-D does not constitute a difference compared to consent policy 442A).

In block 162, the first plurality of rules 346A-D is applied in order of priority to the first record 420A at Xf and at Yf. The text "NO" above the solid lines between the first record 420A and the respective rules 344A, 344B and 344C indicate that the condition(s) of those rules are not matched by the first record 420A, and that those rules are applied in order of priority (e.g., rule 344A, then rule 344B, then rule 344C) to find a rule. The text "YES" above the solid line between the first record 420A and rule 344D indicates that the rule 344D is found based on the condition of rule 344D being met by the consent value 422A in the first record 420A. Rule 344D is found at both Xf and at Yf; both consent policy 442A and consent policy 442B include the first plurality of rules 346A-D and those rules are applied to the same first record 420A at both Xf and at Yf. Rule 344D identifies a result for the second level of the hierarchy 470; the value of that result is "TRUE."

In block 164, a result for the first level of the hierarchy 472 is determined using the consent value 423 associated with the second record 426. The result for the first level of the hierarchy 472 is "OPT OUT" which corresponds to the person identified by "P001" globally denying consent.

Returning to the consent policy 442A, the policy also includes a second plurality of rules 344A-N. In contrast however, consent policy 442B does not include rule 344F in the policy's second plurality of rules. Instead, consent policy 442B includes a rule 344X together with rules 344A-E and 344G-N from the second plurality of rules in the consent policy 442A. The dashed boxes marked by 344A . . . N in consent policy 442B indicate that the corresponding rules 344A-E and G-N may be included in consent policy 442B by reference, or that consent policy 442B is defined in terms of its differences with consent policy 442A (and that those rules do not constitute a difference). The solid box marked by 344X in consent policy 442B indicates that the corresponding rule 344X is not included in consent policy 442B by reference, or that the rule constitutes a difference in consent policy 442B relative to consent policy 442A.

In block 175, a second plurality of rules is applied in order of priority to find another rule based on its respective conditions being met by the result for the first level of the hierarchy 472 and the result for the second level of the hierarchy 470. Here, the rule found differs at Xg compared to the rule found at Yg.

Specifically, in block 175 at Xg the second plurality of rules 344A-E, X, G-N (included in consent policy 442B) is applied in order of priority. Applying rule 344A includes determining whether conditions of rule 344A are met by the result for the first level of the hierarchy 472 (indicated by the line between block 164 and rule 344A) and the result for the second level of the hierarchy 470 (indicated by the line between rule 344D and rule 344A). The conditions of rule 344A are not met by the results, as indicated by the text "NO" above the lines entering rule 344A. However, the conditions of rule 344X are met by the results, indicated by the text "YES" above the lines entering rule 344X (i.e., the lines from block 164 and rule 344D). Thus at Xg the rule 344X is found and identifies whether to proceed. Specifically, rule 344X identifies whether to proceed with emailing the person identified by "P001" for the purposes of billing as provided in query 400A. Rule 344X identifies whether to proceed as "TRUE" 480A.

In contrast, a different rule is found in block 175 at Yg. At Yg, the second plurality of rules 344A-N (included in consent policy 442A) is applied in order of priority. As at Xg, the conditions of rule 344A are not met by the results, as indicated by the text "NO" above the lines entering rule 344A. However, the conditions of rule 344F are met by the results for the first and second levels of the hierarchy, indicated by the text "YES" above the lines entering rule 344F (i.e., the lines from block 164 and rule 344D). Thus at Yg the rule 344F is found and identifies whether to proceed. Specifically, rule 344F identifies whether to proceed with emailing the person identified by "P001" for the purposes of soliciting as provided in query 400B. Rule 344F identifies whether to proceed as "FALSE" 480B whereas rule 344X identifies whether to proceed as "TRUE 480A. Optionally, the values for whether to proceed are included respectively in response 180A to user 450A and in response 180B to user 450B.

In block 482, emails are caused to be sent responsive to the determination of whether to proceed. As discussed, user 450A in the accounting user group 452A submitted query 400A to determine whether to proceed with emailing a person identified by identifier "P001" for purposes of billing. The determination of whether to proceed 480A responsive to the query 400A was TRUE, per response 180A. Thus, in optional block 482, the person identified by "P001" is emailed via the optional email service 485 for purposes of billing. In contrast, user 450B in the sales user group 452B submitted query 400B to determine whether to proceed with emailing person "P001" for purposes of soliciting. The determination of whether to proceed 480B responsive to the query 400B was FALSE, per response 180B. Thus, in optional block 482, no email is caused to be sent to the person identified by "P001" for purposes of soliciting.

Thus, more generally, queries may be submitted by requestor(s) (e.g., a user 450A from the accounting user group 452A and a user 450B from the sales user group 452B) requesting whether to proceed with action(s) (e.g., "Email") with regard to person(s) (e.g., to a person identified by "P001") for particular purpose(s) (e.g., respectively billing ("Bill 406A) and soliciting ("Solicit" 406B)). The respective responses will determine whether the action(s) proceed for the purpose(s) relative to the person(s) (e.g., if the responses are respectively TRUE and FALSE, an email will be sent to the person identified by "P001" for billing purposes, while an email will not be sent to that person for solicitation). In some applications, the queries submitted at a given moment in time are expected to be different in one or more of the requestor, action, person, and/or purpose to which they pertain.

Figure 4B:
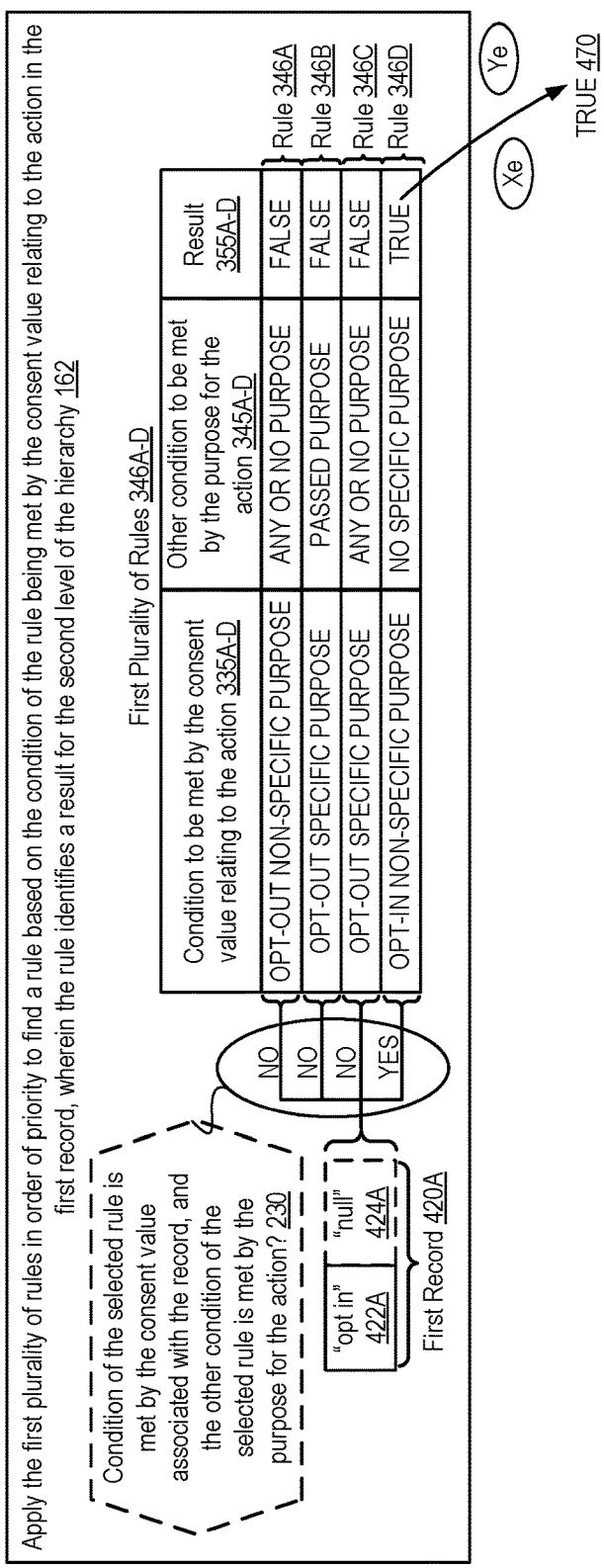
FIG. 4B is a flow diagram illustrating exemplary ways to apply rules to records associated with consent values relating to an action, where the rules identify a result for a second level of a hierarchy of consent values, according to some example implementations.

FIG. 4B is a flow diagram illustrating exemplary ways to apply rules to records associated with consent values relating to an action, where the rules identify a result for a second level of a hierarchy of consent values, according to some example implementations. FIG. 4B shows a first plurality of rules 346A-D (also shown in FIGS. 4A and 3A). In block 162, the first plurality of rules 346A-D is applied in order of priority to find a rule based on the condition 335 of the rule being met by the consent value 422A relating to the action in the first record 420A, wherein the rule identifies a result for the second level of the hierarchy 470. The first plurality of rules 346A-D include a condition to be met by the consent value ("opt in" 422A) relating to the action 335, another condition to be met by the purpose ("null" 424A) for the action 345, and a result 355.

In block 162, rule 346A, rule 346B, rule 346C, and rule 346D are applied in order of priority (i.e., consecutively in this example). For each rule, in optional block 230, a determination is made whether the condition of the rule (i.e., condition to be met by the consent value relating to the action 335A-D) is met by the consent value associated with the record (i.e., "opt in" 422A), and the other condition of the rule (i.e., other condition to be met by the purpose for the action 345A-D) is met by the purpose for the action (i.e., "null" 424A). In the case of rule 346A, "OPT OUT NON-SPECIFIC PURPOSE" is not met by "opt in" as indicated by the text "NO" above the line between the first record 420A and rule 346A. In the cases of rule 346B and rule 346C, "OPT OUT SPECIFIC PURPOSE" is not met by "opt in" as indicated by the text "NO" above the line between the first record 420A and those rules. In the case of rule 346D however, "OPT-IN NON-SPECIFIC PURPOSE" is met by the consent value ("opt in" 422A). Additionally, "ANY OR NO PURPOSE" is met by the purpose ("null" 424A). Thus, both conditions are met, as indicated by the text "YES" above the line between the first record 420A and rule 346D. Rule 346D is found, and the result 355D identifies the result for the second level of the hierarchy (i.e., "TRUE" 470). Referring back to FIG. 4A, the result for the second level of the hierarchy 470 is thus the value TRUE at both Xf and at Yf.

FIG. 4C is a flow diagram illustrating exemplary ways to apply rules to records associated with consent values relating to a person and to results for a second level of a hierarchy of consent values, according to some example implementations. With reference to FIG. 4A, FIG. 4C shows a second plurality of rules 344A-N included in consent policy 442A (also shown in FIG. 3F), and a second plurality of rules 344A-E, X, G-N included in consent policy 442B. In block 175, the second plurality of rules is applied in order of priority to find a rule based on respective conditions of the rule being met by the result for the first (OPT OUT 472) and the second (TRUE 470) levels of the hierarchy, wherein the rule identifies a result 392A-N (i.e., whether to proceed with the action relative to the person 480). The second plurality of rules include a condition to be met by the result for the second level of the hierarchy 365A-N, a condition to be met by the result for the first level of the hierarchy 385A-N, and a result 392.

For consent policy 442A in block 175, rules 344A-F are applied in order of priority (i.e., consecutively in this example). For each of these rules, in optional block 280, a determination is made whether the conditions of the rule are met by the result for the first and second levels of the hierarchy (i.e., OPT OUT 472 and TRUE 470 respectively). In the case of rule 344A, rule 344B, and rule 344C, "UNKNOWN" is not met by TRUE 470 as indicated by the text "NO" above the lines between those rules and the results for the first and second levels of the hierarchy. In the case of rule 344D, and rule 344E, "UNKNOWN" and "NON OPT OUT" respectively are not met by OPT OUT 472 as indicated by the text "NO" above the lines between those rules and the results for the first and second levels of the hierarchy. In the case of rule 344F however, "OPT OUT" is met by OPT OUT 472 and "OPT-IN" is met by TRUE 470 which is mapped to OPT-IN as described with reference to FIG. 4D. Thus, rule 344F is found as indicated by the text "YES" above the line between that rule and the result for the first and second levels of the hierarchy. Result 392F identifies whether to proceed with the action relative to the person 480B. Thus, the determination whether to proceed with the action relative to the person is FALSE 480B at Yg.

Referring back to FIG. 4A, the consent policy 442B includes a second plurality of rules 344A-E, X, G-N. For consent policy 442B in block 175, rules 344A-E and rule 344X are applied in order of priority (i.e., consecutively in this example). For each of rules 344A-E, the conditions of the rule are not met as indicated by the text "NO" above the lines between those rules and the result for the first and second levels of the hierarchy.

Rule 344X is then applied. In the case of rule 344X, "OPT OUT" is met by OPT OUT 472 and "OPT-IN" is met by TRUE 470 which is mapped to OPT-IN as described with reference to FIG. 4D. Thus, rule 344X is found as indicated by the text "YES" above the line between that rule and the result for the first and second levels of the hierarchy. Result 392X identifies whether to proceed with the action relative to the person 480A. Thus, the determination whether to proceed with the action relative to the person is TRUE 480A at Xg.

FIG. 4D is a table illustrating exemplary ways of mapping the result for a second level of a hierarchy of consent values to consent values, according to some example implementations. As evident to one of skill in the art, such a table could be used to map results for other levels of a hierarchy of consent values to consent values (e.g., mapping a result for a first level of a hierarchy to consent values). In some implementations, rules identify for a level of a hierarchy a result which is one of "TRUE" and "FALSE". As shown in the first row of the table, a result of "TRUE" for a level of the hierarchy can be mapped to "OPT IN". As shown in the second row of the table, a result of "FALSE" can be mapped to "OPT OUT". In implementations which support an explanation of a result for a level of the hierarchy (e.g., explanation 357A-H shown in FIG. 3A), the explanation value can be used to enrich the mapping of a result. For example, as shown in the second and third rows of the table, a result of "FALSE" for a level of the hierarchy can be mapped to a value "OPT OUT" when the explanation for the result is either "SUCCESS" or "NO SPECIFIC PURPOSE" (described elsewhere). However, a result of "FALSE" for a level of the hierarchy can be mapped to "UNKNOWN" when the explanation for the result is "INFO NOT FOUND".

Figure 5A:
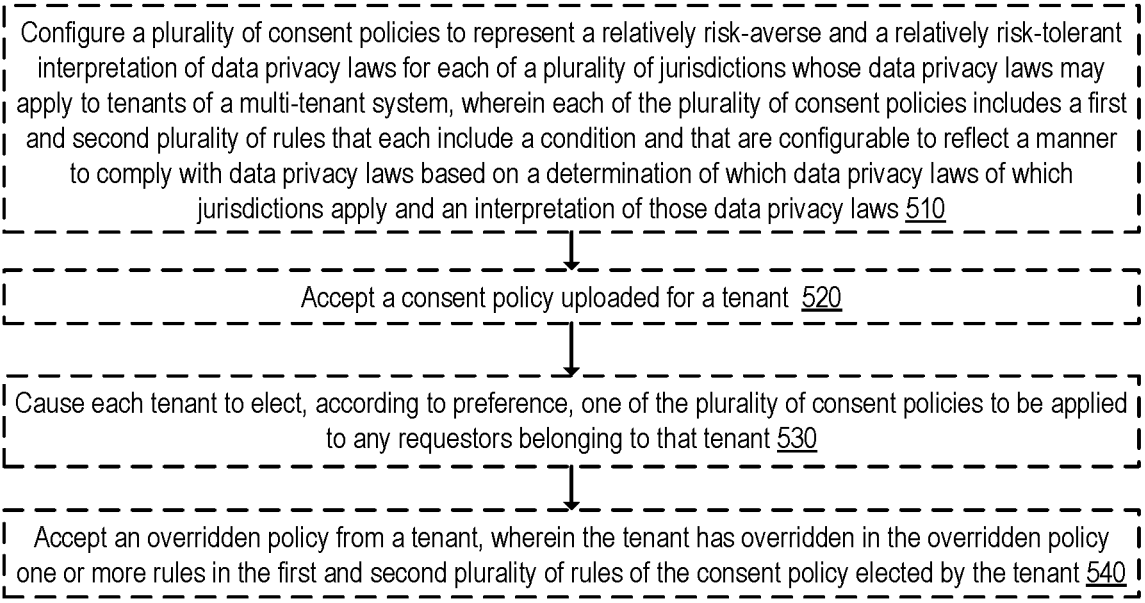
FIG. 5A is a flow diagram illustrating optional ways for consent policies to be configured, elected, and/or overridden, and criteria for selecting a consent policy established, according to some example implementations.

FIG. 5A is a flow diagram illustrating optional ways for consent policies to be configured, elected, and/or overridden, and criteria for selecting a consent policy established, according to some example implementations.

In optional block 510, a plurality of consent policies are configured, and the plurality of consent policies include consent policies that represent relatively risk-averse and relatively risk-tolerant interpretations of data privacy laws for each of a plurality of jurisdictions whose data privacy laws may apply to tenants of a multi-tenant system. Each of the plurality of consent policies includes a first and second plurality of rules that each include a condition and that are configurable to reflect a manner to comply with data privacy laws based on a determination of which data privacy laws of which jurisdictions apply and an interpretation of those data privacy laws. From optional block 510, flow passes to optional block 520.

In optional block 520, a consent policy uploaded for a tenant is accepted. From optional block 520, flow passes to optional block 530.

In optional block 530, each tenant of the plurality of tenants are caused to elect, according to preference, one of the plurality of consent policies (e.g., consent policies 142A-N) to be applied to any requestors belonging to that tenant. For example, referring back to FIG. 1A, each of companies 154A-C could be caused to elect one of the plurality of consent policies 142A-N (e.g., via an administrator 178 for that company). From optional block 530, flow passes to optional block 540.

In optional block 540, an overridden consent policy is accepted from a tenant. The overridden policy is a policy where one or more rules of an existing policy have been modified, deleted, added, and/or disabled (e.g., by the tenant, by a third party on the tenant's behalf, by the vendor, etc.). By modifying, deleting, adding, and/or disabling rules in the first and/or second pluralities of rules in an existing consent policy, a tenant can change the behavior of the existing consent policy as applied in a given context. Referring back to FIGS. 4A and 4C, consent policy 442A included rule 344F but not rule 344X, whereas consent policy 442B included rule 344X but not rule 344F. Consent policy 442A could be characterized as relatively risk-averse, and consent policy 442B as relatively risk-tolerant; rule 344F resolved a conflict between a consent value of "opt-in" at the second level of the hierarchy and a consent value of "opt-out" at the first level of the hierarchy in favor of not proceeding with the action (i.e., FALSE), while rule 344X resolved the conflict the other way (i.e., in favor of proceeding, or TRUE). Applied to the same plurality of records (i.e., including first record 420A and second record 426), consent policy 442A and consent policy 442B resulted in differing determinations of whether to proceed with emailing person "P001". Specifically, applying consent policy 442A resulted in a determination of whether to proceed of FALSE 480B, whereas applying consent policy 442B resulted in a determination of whether to proceed of TRUE 480A. Thus, modifying, deleting, adding, and/or disabling rules in an existing consent policy can change the behavior of that existing consent policy and/or form a new consent policy (in both cases, sometimes referred to as an "overridden consent policy"), offering improved configurability, adaptability, and/or support for a greater number of different consent policy preferences, especially in the context of supporting many users with different preferences (e.g., many tenants in a multi-tenant system).

In some implementations, after accepting an overridden consent policy or an uploaded consent policy from or for a tenant, that consent policy is validated. Validating the consent policy may include 1) validating the form of the consent policy (e.g., that the policy includes an appropriate number of conditions in each rule; that the policy includes the appropriate pluralities of rules (e.g., a first and second plurality of rules); that the policy is in human-readable format if specified as such; that the policy is well-formed (e.g., well-formed XML, CSV, JSON), etc.); and/or 2) validating the contents of the consent policy (e.g., that the rules included in the policy are logically consistent; that the policy includes a default rule if the rules included in the policy do not guarantee that the conditions of at least one rule will be met; that the policy passes a checksum; etc.). Additionally or alternatively, after accepting a consent policy from or for a tenant, the consent policy is stored. Storing the consent policy may optionally include 1) determining which (if any) rules included in the policy are included in other consent policies, and including those rules by reference in the policy, and 2) determining which (if any) rules included in the policy are not included in other consent policies, and storing those rules appropriately (e.g., in a repository of rules from which rules can be referenced).

The consent policies will be used in block 140 as previously described. In systems which implement optional block 510, those consent policies will include consent policies configured to represent relatively risk-averse and relatively risk-tolerant interpretations of data privacy laws for each of a plurality of jurisdictions whose data privacy laws apply to tenants of a multi-tenant system. In systems which implement optional block 520, those consent policies may include the uploaded consent policy. In systems which implement optional block 530, each tenant of the multi-tenant system will be caused to elect one of those consent policies. In systems which implement optional block 540, those consent policies may include one or more consent policy overridden by one or more tenants (e.g., a tenant may elect a consent policy, and then generate from it an overridden consent policy). Consequently, implementing one or more of optional blocks 510, 520, 530, and 540 can provide significant flexibility for achieving compliance with data privacy laws, accommodating different interpretations of those laws, adapting to evolutions in such laws, and providing a technological environment which is adapted for multiple tenants and multiple requestors.

Figure 5B:
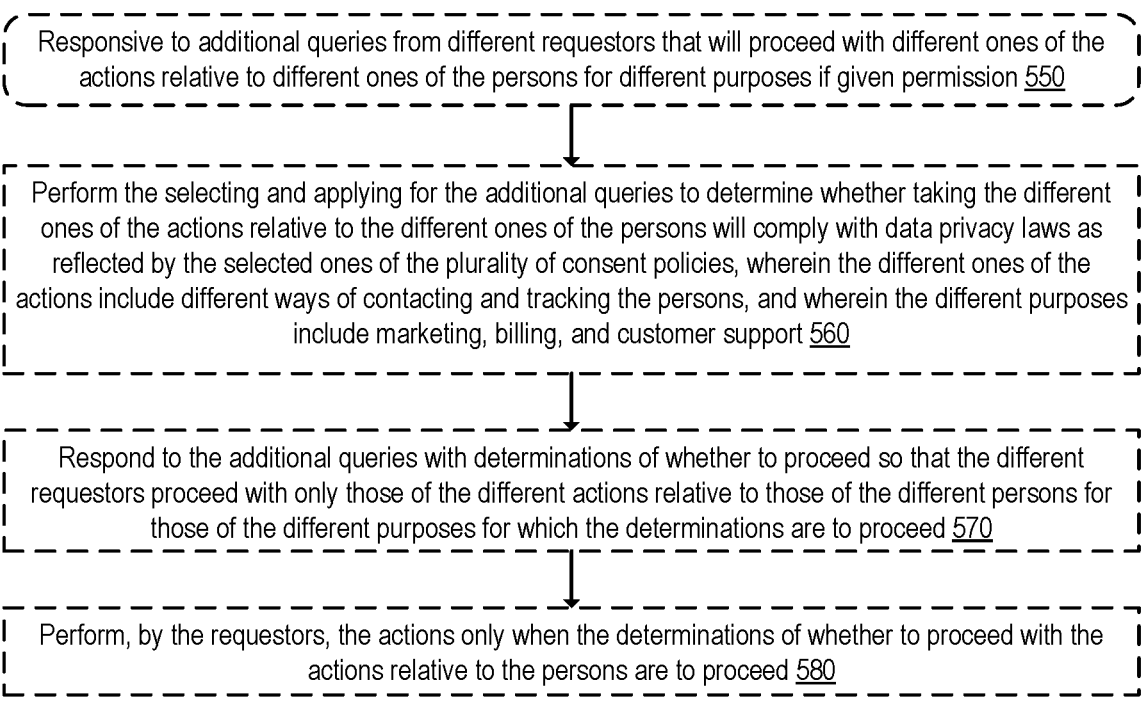
FIG. 5B is a flow diagram illustrating the processing of queries submitted by different requestors that are asking whether to proceed with different actions relative to different persons for different purposes, according to some implementations.

FIG. 5B is a flow diagram illustrating the processing of queries submitted by different requestors that are asking whether to proceed with different actions relative to different persons for different purposes, according to some implementations. Responsive to these queries (optional block 550), flow passes to optional block 560.

In optional block 560, the selection and application of consent policies is performed for the queries to determine whether taking the different actions relative to the different persons will comply with data privacy laws as reflected by the selected ones of the plurality of consent policies. This is performed as previously described. In some implementations the different ones of the actions include different ways of contacting and tracking the persons, and wherein the different purposes include marketing, billing, and customer support. From optional block 560, flow passes to optional block 570.

In optional block 570, the queries are responded to with determinations of whether to proceed so that the different requestors proceed with only those of the different actions relative to those of the different persons for those of the different purposes for which the determinations are to proceed. From optional block 570, flow passes to optional block 580.

In optional block 580, the requestors perform the actions only when the determinations of whether to proceed with the actions relative to the persons are to proceed. An example is discussed with reference to FIG. 4A.

Exemplary Users

The term "user" is a generic term referring to an entity (e.g., an individual person) using a system and/or service. A multi-tenant architecture provides each tenant with a dedicated share of a software instance and the ability (typically) to input tenant-specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a CRM system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining one or more applications on a PAAS.

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other forms of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to other electronic device(s) (sometimes referred to as a client electronic device, a client computing device, and/or a client device) that executes client software (sometimes referred to as client code and/or an end user client) to communicate with the service. The server and client electronic devices may be operated by users respectively in the roles of administrator (also known as an administrative user) and end user.

Figure 6A:
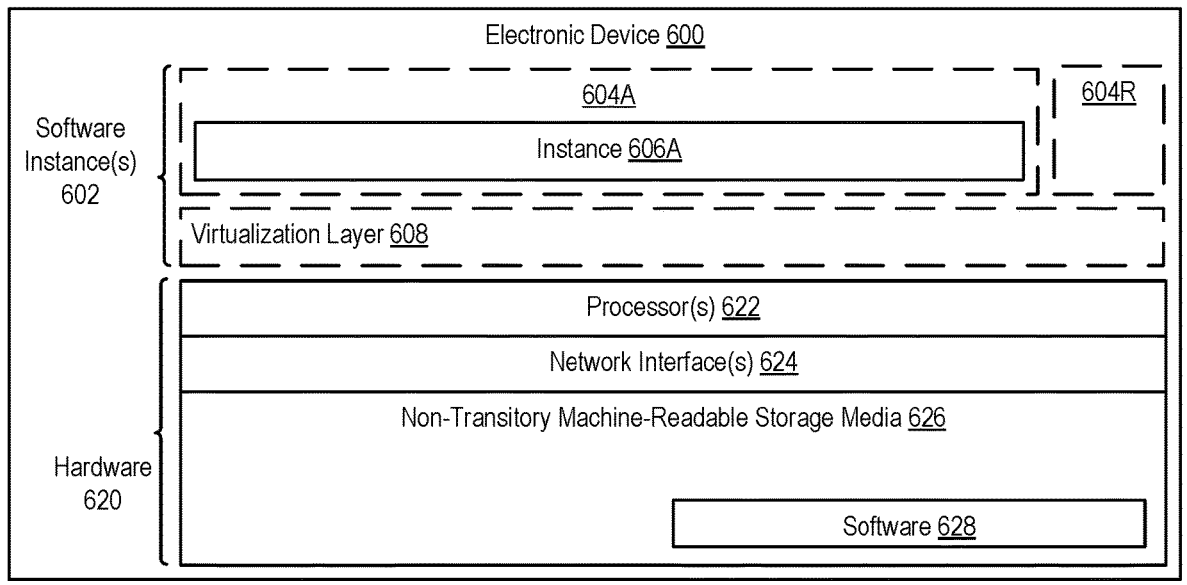
FIG. 6A is a block diagram illustrating an electronic device according to some example implementations.

FIG. 6A is a block diagram illustrating an electronic device 300 according to some implementations. FIG. 6A includes hardware 620 comprising a set of one or more processor(s) 622, a set of one or more network interfaces 624 (wireless and/or wired), and non-transitory machine-readable storage media 626 having stored therein software 628 (which includes instructions executable by the set of one or more processor(s) 622). Each of the previously described end user clients and the policy-based consent-checking service may be implemented in one or more electronic devices 600. In one implementation: 1) each of the end user clients is implemented in a separate one of the electronic devices 600 (e.g., in user electronic devices operated by users where the software 628 represents the software to implement end user clients (e.g., a web browser, a native client, a portal, a command-line interface, and/or an API based upon protocols such as Simple Object Access Protocol (SOAP), Representational State Transfer (REST), etc.)) to interface directly and/or indirectly with the policy-based consent-checking service; and 2) the policy-based consent-checking service is implemented in a separate set of one or more of the electronic devices 600 (e.g., a set of one or more server electronic devices where the software 628 represents the software to implement the policy-based consent-checking service); and 3) in operation, the electronic devices implementing the end user clients and the policy-based consent-checking service would be communicatively coupled (e.g., by a network) and potentially through other services. In the case of interfacing directly, the end user clients and policy-based consent-checking service would establish between them (or through one or more other layers) connections for submitting one or more requests (including queries) to the policy-based consent-checking service and returning one or more results (including query results) to the end user clients. In the case of indirectly interfacing through one or more other services, an end user client may interact with one of these other services (e.g., cause a marketing service to run a marketing campaign), and this other service may submit one or more requests (including queries) to the policy-based consent-checking service and use the returned results (e.g., in the case of the marketing service running the marketing campaign, causing communications (e.g., emails) to be sent to users). Other configurations of electronic devices may be used in other implementations (e.g., an implementation in which the end user client and the policy-based consent-checking service are implemented on a single electronic device 600).

In electronic devices that use compute virtualization, the set of one or more processor(s) 622 typically execute software to instantiate a virtualization layer 608 and software container(s) 604A-R (e.g., with operating system-level virtualization, the virtualization layer 608 represents the kernel of an operating system (or a shim executing on a base operating system) that allows for the creation of multiple software containers 604A-R (representing separate user space instances and also called virtualization engines, virtual private servers, and/or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation an instance of the software 628 (illustrated as instance 606A) is executed within the software container 604A on the virtualization layer 608. In electronic devices where compute virtualization is not used, the instance 606A on top of a host operating system is executed on the "bare metal" electronic device 600. The instantiation of the instance 606A, as well as the virtualization layer 608 and software containers 604A-R if implemented, are collectively referred to as software instance(s) 602.

Alternative implementations of an electronic device may have numerous variations from that described above. For example, customized hardware and/or accelerators might also be used in an electronic device.

Exemplary Environment

Figure 6B:
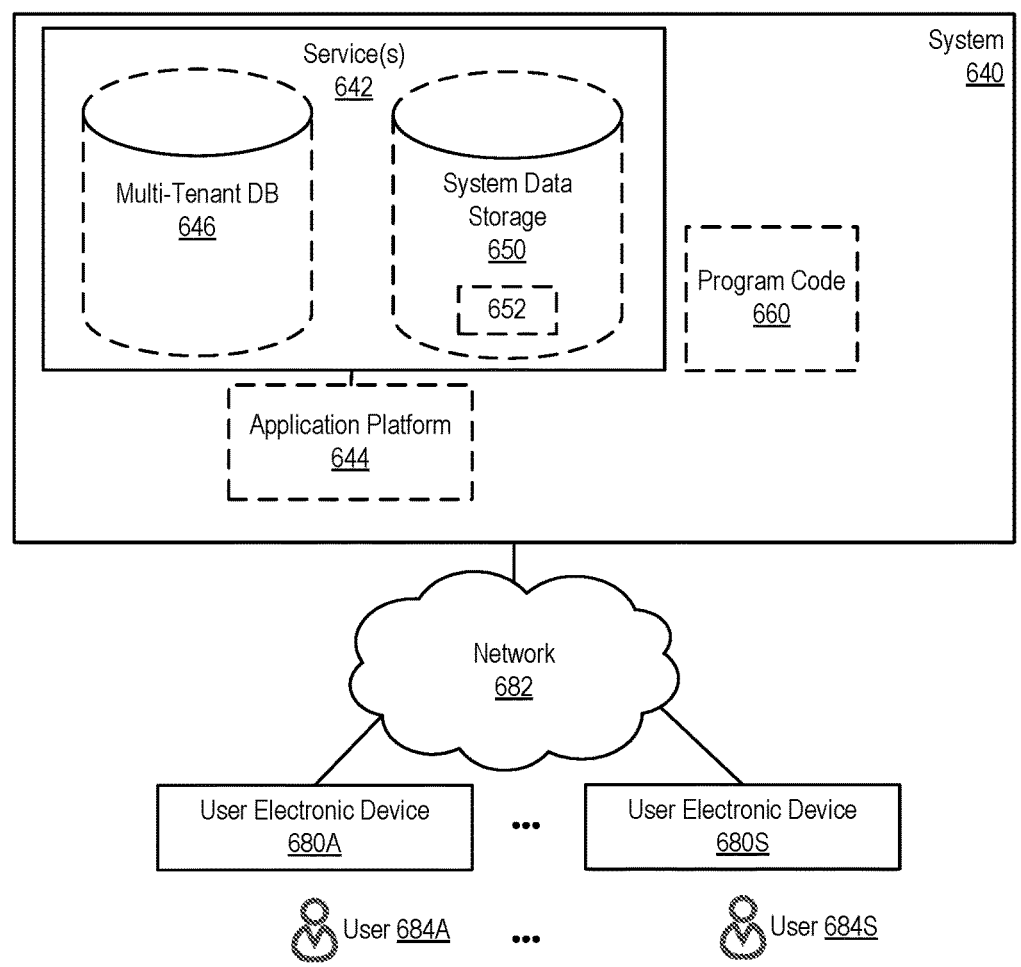
FIG. 6B is a block diagram of an environment where a policy-based consent-checking service may be deployed, according to some implementations.

FIG. 6B is a block diagram of an environment where the database service may be deployed, according to some implementations. A system 640 includes hardware (a set of one or more electronic devices) and software to provide service(s) 642, including the policy-based consent-checking service. The system 640 is coupled to user electronic devices 680A-S over a network 682. The service(s) 642 may be on-demand services that are made available to one or more of the users 684A-S working for one or more other organizations (sometimes referred to as outside users) so that those organizations do not need to necessarily be concerned with building and/or maintaining a system, but instead makes use of the service(s) 642 when needed (e.g., on the demand of the users 684A-S). The service(s) 642 may communicate with each other and/or with one or more of the user electronic devices 680A-S via one or more Application Programming Interface(s) (APIs) (e.g., a REST API). The user electronic devices 680A-S are operated by users 684A-S.

In one implementation, the system 640 is a multi-tenant cloud computing architecture supporting multiple services, such as a CRM service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). For example, system 640 may include an application platform 644 that enables PAAS for creating, managing, and executing one or more applications developed by the provider of the application platform 644, users accessing the system 640 via one or more of user electronic devices 680A-S, or third-party application developers accessing the system 640 via one or more of user electronic devices 680A-S.

In some implementations, one or more of the service(s) 642 may utilize one or more multi-tenant databases 646, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user electronic device 680A-S communicate with the server(s) of system 640 to request and update tenant-level data and system-level data hosted by system 640, and in response the system 640 (e.g., one or more servers in system 640) automatically may generate one or more SQL statements that are designed to access the desired information from the one or more multi-tenant database 646 and/or system data storage 650.

In some implementations, the service(s) 642 are implemented using virtual applications dynamically created at run time responsive to queries from the user electronic devices 680A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including the policy-based consent-checking service, may be coded using PL/SOQL. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, and/or other appropriate configuration. The network may comply with one or more network protocols, including an Institute of Electrical and Electronics Engineers (IEEE) protocol, a third Generation Partnership Project (3GPP) protocol, a fourth generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user electronic devices 680A-S.

Each user electronic device 680A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video and/or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow a user 684 to interact with various GUI pages that may be presented to a user 684. User electronic devices 680A-S might communicate with system 640 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an API (e.g., gus.lightning.force.com/lightning/r/0D5B000000mhTIX/view) based upon protocols such as Simple Object Access Protocol (SOAP), REST, etc.

In an example where HTTP is used, one or more user electronic devices 680A-S might include an HTTP client, commonly referred to as a "browser," for sending and receiving HTTP messages to and from server(s) of system 640, thus allowing users 684 of the user electronic device 680A-S to access, process and view information, pages and applications available to it from system 640 over network 682.

CONCLUSION

Bracketed text and blocks with dashed borders (e.g., large dashes, small dashes, dot-dash, and dots) may be used to illustrate optional operations and/or structures that add additional features to some implementations. However, such notation does not mean that these are the only options and/or optional operations, and/or that blocks with solid borders are not optional in certain implementations.

The detailed description and claims may use the term "coupled," along with its derivatives. "Coupled" is used to indicate that two or more elements, which may or may not be in direct physical and/or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, overlap certain operations, perform certain operations in parallel or substantially in parallel, etc.).

While the above description includes several exemplary implementations, the invention is not limited to the implementations described and can be practiced with modification and alteration within the spirit and scope of the appended claims. The description is thus illustrative instead of limiting.

What is claimed is:

1. A method for using consent policies to determine whether to proceed with actions relative to persons based on a hierarchy of consent values for that person, the hierarchy including a first level involving consent values for persons and a second level involving consent values for actions, the method comprising:
   responsive to a query in which an identifier and an action are provided, retrieving a corresponding plurality of records which include a first and second record each associated with a consent value respectively relating to the action and to a person, wherein the consent value, the action, and the person pertain to the person's consent for another entity to perform the action in view of data privacy laws;
   selecting from a plurality of consent policies a currently selected consent policy based on a current set of one or more criteria, wherein each of the plurality of consent policies includes a first and second plurality of rules that each include a condition and that are configurable in a multi-tenant system by one or more of an administrator of the multi-tenant system and tenants of the multi-tenant system to reflect a manner to comply with data privacy laws based on a determination of which data privacy laws of which jurisdictions apply and an interpretation of those data privacy laws;
   applying the currently selected consent policy to the plurality of records to determine whether to proceed with the action, the applying comprising:
      applying the first plurality of rules in order of priority to find a rule based on the condition of the rule being met by the consent value relating to the action in the first record, wherein the rule identifies a result for the second level of the hierarchy;
      determining a result for the first level of the hierarchy using the consent value associated with the second record;
      applying the second plurality of rules in order of priority to find another rule based on respective conditions of the another rule being met by the result for the first and second levels of the hierarchy, wherein the another rule identifies whether to proceed with the action relative to the person; and
   responsive to applying the second plurality of rules, responding to the query with a determination of whether to proceed with the action relative to the person.

2. The method of claim 1, further comprising:
   selecting, from the plurality of consent policies, another consent policy, wherein the another consent policy's first and second plurality of rules reflect a different manner to comply with data privacy laws to that of the consent policy; and responsive to another query, retrieving another plurality of records corresponding to another identifier and another action both provided in the another query;

applying the another consent policy to the another plurality of records to determine whether to proceed with the another action; and responsive to applying the another consent policy to the another plurality of records, responding to the another query with another determination of whether to proceed with the another action.

3. The method of claim 2, wherein the query is submitted for a tenant of a plurality of tenants and the another query is submitted for another tenant of the plurality of tenants, and wherein the consent policy and the another consent policy are ones that respectively represent a relatively risk-averse and a relatively risk-tolerant interpretation of data privacy laws, the method further comprising before the selecting from the plurality of consent policies:

configuring the plurality of consent policies to include relatively risk-averse and relatively risk-tolerant interpretations of data privacy laws; and causing each tenant of the plurality of tenants to elect, according to preference, one of the plurality of consent policies to be applied to any requestors belonging to that tenant.

4. The method of claim 3, the method further comprising:

accepting an overridden policy from the tenant, wherein the tenant has overridden in the overridden policy one or more rules in the first and second plurality of rules of the consent policy elected by the tenant.

5. The method of claim 1, wherein the consent value associated with the first record indicates one of opt-in, opt-out, or unknown, wherein the consent value associated with the second record indicates one of opt-in, opt-out, or unknown, and wherein the action is one of email, phone, tracking, web, and social media.

6. The method of claim 1, wherein the plurality of records further includes a third record associated with another consent value relating to the person, and wherein the determining a result for the first level of the hierarchy includes using a result of an operation based on the consent value associated with the second record and the another consent value associated with the third record.

7. The method of claim 1, wherein the plurality of records further includes a third record associated with another consent value relating to the person, wherein each of the plurality of consent policies further includes a third plurality of rules that each include a first and second condition and that are configurable, and wherein the determining a result for the first level of the hierarchy includes:

applying to the third record the consent policy's third plurality of rules in order of priority to find yet another rule based on the conditions of that rule being met by the consent value associated with the second and third records respectively; and identifying the result for the first level of the hierarchy using the yet another rule.

8. The method of claim 1, wherein a purpose for the action is also in the first record, and wherein the applying the consent policy's first plurality of rules in order of priority to find a rule is also based on another condition of the rule being met by the purpose for the action.

9. The method of claim 8, wherein different ones of the plurality of consent policies were configured to reflect manners to comply with applicable data privacy laws for purposes of marketing, billing, and customer support, wherein the purpose provided in the query is one of those purposes and the action is one of email, social media, and telephone, wherein the query is submitted by a tenant of a multi-tenant system who wishes to undertake that action for that purpose in compliance with data privacy laws, and wherein the method further comprises causing said action to be performed for said purpose responsive to the determination of whether to proceed indicating that the tenant may proceed in compliance with data privacy laws.

10. The method of claim 8, wherein a timestamp provided in the query corresponds with an effective time range for the consent value associated with the first record.

11. The method of claim 1, wherein the current set of criteria includes one or more of a service, a user, a user group to which the user belongs, a location for the person, information in the query, and a tenant, company, or division of a company to which the user or the service belongs.

12. The method of claim 1, wherein the selecting occurs before a user's submission of the query, and wherein the current set of criteria is based on information associated with credentials used to authenticate the user.

13. The method of claim 1, wherein the selecting occurs after the retrieving the corresponding plurality of records, and wherein the current set of criteria is based on a location for the person included in the plurality of records.

14. The method of claim 1, further comprising:

responsive to additional queries from different requestors that will proceed with different ones of the actions relative to different ones of the persons for different purposes if given permission, performing the selecting and applying for the additional queries to determine whether taking the different ones of the actions relative to the different ones of the persons will comply with data privacy laws as reflected by the selected ones of the plurality of consent policies, wherein the different ones of the actions include different ways of contacting and tracking the persons, and wherein the different purposes include marketing, billing, and customer support; and responding to the additional queries with determinations of whether to proceed so that the different requestors proceed with only those of the different actions relative to those of the different persons for those of the different purposes for which the determinations are to proceed.

15. A non-transitory machine readable medium having stored therein a set of instructions that when executed by a computer system implement a set of operations for a method for using consent policies to determine whether to proceed with actions relative to persons based on a hierarchy of consent values for that person, the hierarchy including a first level involving consent values for persons and a second level involving consent values for actions, the set of operations comprising:

responsive to a query in which an identifier and an action are provided, retrieving a corresponding plurality of records which include a first and second record each associated with a consent value respectively relating to the action and to a person, wherein the consent value, the action, and the person pertain to the person's consent for another entity to perform the action in view of data privacy laws;

selecting from a plurality of consent policies a currently selected consent policy based on a current set of one or more criteria, wherein each of the plurality of consent policies includes a first and second plurality of rules that each include a condition and that are configurable in a multi-tenant system by one or more of an administrator of the multi-tenant system and tenants of the multi-tenant system to reflect a manner to comply with data privacy laws based on a determination of which data privacy laws of which jurisdictions apply and an interpretation of those data privacy laws;

applying the currently selected consent policy to the plurality of records to determine whether to proceed with the action, the applying including, applying the first plurality of rules in order of priority to find a rule based on the condition of the rule being met by the consent value relating to the action in the first record, wherein the rule identifies a result for the second level of the hierarchy, determining a result for the first level of the hierarchy using the consent value associated with the second record, and applying the second plurality of rules in order of priority to find another rule based on respective conditions of the another rule being met by the result for the first and second levels of the hierarchy, wherein the another rule identifies whether to proceed with the action relative to the person, and responsive to applying the second plurality of rules, responding to the query with a determination of whether to proceed with the action relative to the person.

16. The non-transitory machine-readable medium of claim 15, wherein the set of operations further comprise:

selecting, from the plurality of consent policies, another consent policy, wherein the another consent policy's first and second plurality of rules reflect a different manner to comply with data privacy laws to that of the consent policy; and responsive to another query, retrieving another plurality of records corresponding to another identifier and another action both provided in the another query;

applying the another consent policy to the another plurality of records to determine whether to proceed with the another action; and responsive to applying the another consent policy to the another plurality of records, responding to the another query with another determination of whether to proceed with the another action.

17. The non-transitory machine-readable medium of claim 16, wherein the query is submitted for a tenant of a plurality of tenants and the another query is submitted for another tenant of the plurality of tenants, and wherein the consent policy and the another consent policy are ones that respectively represent a relatively risk-averse and a relatively risk-tolerant interpretation of data privacy laws, the method further comprising before the selecting from the plurality of consent policies:

configuring the plurality of consent policies to include relatively risk-averse and relatively risk-tolerant interpretations of data privacy laws; and causing each tenant of the plurality of tenants to elect, according to preference, one of the plurality of consent policies to be applied to any requestors belonging to that tenant.

18. The non-transitory machine-readable medium of claim 17, wherein the set of operations further comprise:

accepting an overridden policy from the tenant, wherein the tenant has overridden in the overridden policy one or more rules in the first and second plurality of rules of the consent policy elected by the tenant.

\* \* \* \* \*